(12) United States Patent
Kim et al.

(10) Patent No.: US 12,189,648 B2
(45) Date of Patent: Jan. 7, 2025

(54) APPARATUS AND METHOD FOR MANAGING INTEGRATED STORAGE

(71) Applicant: ELECTRONICS AND TELECOMMUNICATIONS RESEARCH INSTITUTE, Daejeon (KR)

(72) Inventors: Dae-Won Kim, Daejeon (KR); Sun-Wook Kim, Hwaseong (KR); Seong-Woon Kim, Gyeryong (KR); Soo-Cheol Oh, Daejeon (KR); Jae-Geun Cha, Daejeon (KR); Ji-Hyeok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 441 days.

(21) Appl. No.: 16/121,384

(22) Filed: Sep. 4, 2018

(65) Prior Publication Data

US 2019/0121899 A1   Apr. 25, 2019

(30) Foreign Application Priority Data

Oct. 23, 2017   (KR) .................... 10-2017-0137712
Mar. 27, 2018   (KR) .................... 10-2018-0034861
(Continued)

(51) Int. Cl.
*G06F 16/25*    (2019.01)
*G06F 3/06*     (2006.01)
(Continued)

(52) U.S. Cl.
CPC .......... *G06F 16/258* (2019.01); *G06F 3/067* (2013.01); *G06F 16/22* (2019.01); *H04L 67/1097* (2013.01)

(58) Field of Classification Search
CPC ...... G06F 16/122; G06F 16/185; G06F 3/067; H04L 67/1097
See application file for complete search history.

(56) References Cited

U.S. PATENT DOCUMENTS 8,171,241 B2   5/2012   Nagai et al.
8,225,009 B1   7/2012   Nayak
(Continued)

FOREIGN PATENT DOCUMENTS

EP   2284725 A1   2/2011
EP   2871817 A1   5/2015
(Continued)

OTHER PUBLICATIONS

"Proposal of general requirements for data storage federation in Y.dsf-reqts," SG13 Q17 Interim Meeting, Telecommunication Standardization Sector Study Period 2017-2020, International Telecommunication Union, Sep. 4-8, 2017, pp. 1-3, Electronics and Telecommunications Research Institute (ETRI), Warsaw, Poland.
(Continued)

*Primary Examiner* — Marc S Somers

(57) ABSTRACT

Disclosed herein are an apparatus and method for managing integrated storage. The apparatus includes a data distribution and storage unit for distributing data in order to store the data in integrated storage, including on-premises storage and cloud storage; a storage management unit for connecting to the integrated storage in order to store the data and providing information about storage tiering pertaining to the data; a data manipulation unit for providing the integrated storage as virtual data storage regardless of a location at which the data is actually stored; and a storage connection unit for providing a user with an interface for the created virtual data storage as a single virtual storage unit, wherein the information about storage tiering varies depending on the per-
(Continued)

formance of storage, the time during which the data is used, and the frequency with which the data is accessed.

8 Claims, 17 Drawing Sheets

(30) Foreign Application Priority Data

May 14, 2018 (KR) .................. 10-2018-0054966
Aug. 20, 2018 (KR) .................. 10-2018-0096889

(51) Int. Cl.
*G06F 16/22* (2019.01)
*H04L 67/1097* (2022.01)

(56) References Cited

U.S. PATENT DOCUMENTS

| | | | |
|---|---|---|---|
| 8,370,312 B1* | 2/2013 | Sawhney ............ | H04L 67/1097 707/694 |
| 8,793,343 B1* | 7/2014 | Sorenson, III ...... | G06F 11/2092 709/219 |
| 8,805,951 B1 | 8/2014 | Faibish et al. | |
| 9,076,250 B2 | 7/2015 | Kim et al. | |
| 9,250,813 B2 | 2/2016 | Oshima | |
| 9,462,055 B1* | 10/2016 | Herrin ................ | H04L 67/1095 |
| 9,588,901 B2 | 3/2017 | Chahal et al. | |
| 9,678,880 B1 | 6/2017 | Korotaev et al. | |
| 9,697,376 B2 | 7/2017 | Madanapalli et al. | |
| 9,727,470 B1 | 8/2017 | Cande et al. | |
| 9,940,231 B2 | 4/2018 | Vaisanen et al. | |
| 2002/0133504 A1* | 9/2002 | Vlahos ................ | G06F 16/256 |
| 2005/0080880 A1 | 4/2005 | Von Tetzchner et al. | |
| 2010/0122184 A1* | 5/2010 | Vonog ................ | H04L 12/1827 715/753 |
| 2010/0161759 A1* | 6/2010 | Brand ................ | H04L 67/1095 709/218 |
| 2010/0211731 A1* | 8/2010 | Mittendorff ......... | G06F 12/0866 711/E12.019 |
| 2011/0196824 A1* | 8/2011 | Maes ................ | H04L 67/1095 707/610 |
| 2012/0089775 A1* | 4/2012 | Ranade ................ | G06F 16/183 711/170 |
| 2013/0036277 A1* | 2/2013 | Szczepkowski ...... | G06F 3/0641 711/E12.001 |
| 2013/0159359 A1 | 6/2013 | Kumar et al. | |
| 2013/0254326 A1 | 9/2013 | Weng et al. | |
| 2014/0067990 A1 | 3/2014 | Abdelhameed et al. | |
| 2015/0205819 A1 | 7/2015 | Brand | |
| 2016/0142399 A1 | 5/2016 | Pace et al. | |
| 2016/0292193 A1 | 10/2016 | Madanapalli et al. | |
| 2016/0294549 A1* | 10/2016 | Qian .................... | H04L 9/0822 |
| 2017/0132429 A1* | 5/2017 | Bell .................... | H04L 9/0861 |
| 2017/0147755 A1 | 5/2017 | Lim et al. | |
| 2017/0193233 A1 | 7/2017 | Lorini | |
| 2017/0195417 A1 | 7/2017 | Brand | |
| 2017/0208043 A1 | 7/2017 | Bohli et al. | |
| 2017/0208052 A1 | 7/2017 | Jai et al. | |
| 2018/0089224 A1* | 3/2018 | Muthuswamy ......... | G06F 16/13 |
| 2018/0095915 A1 | 4/2018 | Prabhakar et al. | |

FOREIGN PATENT DOCUMENTS

| | | |
|---|---|---|
| JP | 2008108050 A | 5/2008 |
| JP | 2015-520426 A | 7/2015 |
| JP | 2017126348 A | 7/2017 |
| KR | 10-1212778 B1 | 12/2012 |
| KR | 20140139776 A | 12/2014 |
| KR | 10-2016-0138448 A | 12/2016 |
| KR | 10-2017-0107967 A | 9/2017 |

OTHER PUBLICATIONS

"Proposal of use case for data cache in Y.dsf-reqts," SG13 Q17 Interim Meeting, Telecommunication Standardization Sector Study Period 2017-2020, International Telecommunication Union, Sep. 4-8, 2017, pp. 1-3, Electronics and Telecommunications Research Institute (ETRI), Warsaw, Poland.

"Proposal to add logical components in Y.dsf-reqts," SG13 Q17 Interim Meeting, Telecommunication Standardization Sector Study Period 2017-2020, International Telecommunication Union, Sep. 4-8, 2017, pp. 1-3, Electronics and Telecommunications Research Institute (ETRI), Warsaw, Poland.

"Proposal to use case for data storage federation service customer of virtual data storage in Y.dsf-reqts," SG13-C301-R2, Study Group 13, Telecommunication Standardization Sector Study Period 2017-2020, International Telecommunication Union, Nov. 6-17, 2017, pp. 1-2, Electronics and Telecommunications Research Institute (ETRI), Geneva, Switzerland.

"Proposal to use case of data storage federation management in Y.dsf-reqts," SG13-C300-R1, Study Group 13, Telecommunication Standardization Sector Study Period 2017-2020, International Telecommunication Union, Nov. 6-17, 2017, pp. 1-3, Electronics and Telecommunications Research Institute (ETRI), Geneva, Switzerland.

* cited by examiner

APPARATUS AND METHOD FOR MANAGING INTEGRATED STORAGE

CROSS REFERENCE TO RELATED APPLICATIONS

This application claims the benefit of Korean Patent Application No. 10-2017-0137712, filed Oct. 23, 2017, No. 10-2018-0034861, filed Mar. 27, 2018, No. 10-2018-0054966, filed May 14, 2018, and No. 10-2018-0096889, filed Aug. 20, 2018, which are hereby incorporated by reference in their entirety into this application.

BACKGROUND OF THE INVENTION

1. Technical Field

The present invention relates generally to cloud-computing technology, and more particularly to a storage integration method for combining cloud storage and non-cloud storage.

2. Description of the Related Art

These days, the development of technology for cloud computing, which enables a user to use a desired service without restrictions as to time and place, is accelerated, and market demand therefor continues to increase. Cloud computing may provide network, storage, and computing services desired by users using the Internet, without the need to provide hardware and software for each user.

In the case of a storage system related to a data storage service, among cloud-computing techniques, a user may request to store data using a secure and convenient service interface provided by the system. In this regard, a cloud-integrated storage system that stores data in cloud-integrated storage that appears as a single storage space even though both on-premises storage and public cloud storage are integrated therein has been developed.

Particularly, the cloud-integrated storage system may manage and operate on-premises public storage that appears as a single storage space while making use of the advantages both of on-premises storage possessed by companies and organizations and of public cloud storage provided by a cloud provider.

Using on-premises public storage appearing as a single storage space, the cloud-integrated storage system may provide a converged storage infrastructure service that secures the flexibility and cost efficiencies of a storage space and guarantees reliability and control over sensitive data.

Accordingly, the cloud-integrated storage system may extend the use of cloud services to various fields and use cloud services in order to create new business models.

Trends of existing similar systems are as follows.

In order to support operations for 'IDC's 3rd Platform', for example, real-time analysis, IoT, AI computing, and the like, there is a strong demand to construct and adopt a hybrid cloud-computing service.

Also, IDC's 3rd Platform aims to support the extension of computing resources by unifying various cloud models and to improve automation and computing environment management efficiency.

HP provides infrastructure management functions using a RESTful API based on OpenStack and provides a Helion *Eucalyptus* platform, which is open-source software designed to be compatible with Amazon Web Services (AWS).

VMware launched vCloud Hybrid Service (vCHS), which provides virtualization of servers, storage, and networking in an integrated manner based on existing virtualization solutions and infrastructure of VMware.

Rackspace focuses on the extension of cloud infrastructure and integrates a cloud server with an enterprise Storage Area Network (SAN). Also, Rackspace supports data protection by deploying Cisco ASA firewalls.

Avere FlashCloud of Avere Systems and StorSimple of Microsoft have cloud storage gateway capabilities for storage tiering, based on which data is stored in local or cloud storage depending on the frequency of use of the data, in order to provide data backup, archiving, and applications for a tier 2 level, as well as a disaster recovery service.

Data replication for storing the same data in both local storage and public storage may be performed through copying in a cloud storage gateway, and a cloud storage gateway solution of CTERA Networks is a representative example thereof. The solution additionally provides file distribution, synchronization and sharing services.

Meanwhile, Korean Patent No. 10-1212778, titled "Cloud-computing-based smart office system and server and method for operating the same", discloses a smart office system, including a cloud-based mobile web server and an on-premises mobile web server, and a server and method for operating the smart office system.

SUMMARY OF THE INVENTION

An object of the present invention is to improve the performance of read/write operations in integrated storage that combines cloud storage and on-premises storage.

Another object of the present invention is to enable cloud storage and on-premises storage included in integrated storage to provide a data storage service with the same performance.

A further object of the present invention is to move data of a user based on the flexibility of a storage space and cost efficiencies.

Yet another object of the present invention is to support various types of cloud storage services, such as Amazon S3, Microsoft Azure, and the like, thereby providing an integrated storage service that meets user requirements.

Still another object of the present invention is to enable data in cloud storage to be accessed at a speed close to the speed at which data in on-premises storage is accessed.

Still another object of the present invention is to provide a service interface through which a user may access cloud-integrated storage using various service protocols.

Still another object of the present invention is to provide various types of storage services, such as a storage service for storing conventional files or data blocks, a storage service for storing objects, which has recently come to be provided by cloud storage providers, and the like.

Still another object of the present invention is to guarantee secure data transfer between on-premises storage and cloud storage, thereby guaranteeing the confidentiality of user data.

Still another object of the present invention is to prevent data loss caused due to system errors.

Still another object of the present invention is to provide a multi-tenant function for simultaneously performing multiple cloud services.

In order to accomplish the above objects, an apparatus for managing integrated storage according to an embodiment of the present invention includes a data distribution and storage unit for distributing data in order to store the data in integrated storage, including on-premises storage and cloud storage; a storage management unit for connecting to the integrated storage in order to store the data and providing information about storage tiering pertaining to the data; a data manipulation unit for providing the integrated storage as virtual data storage regardless of the location at which the data is actually stored; and a storage connection unit for providing a user with an interface for the created virtual data storage as a single virtual storage unit. Here, the information about storage tiering may vary depending on the performance of storage, the time during which the data is used, and the frequency with which the data is accessed.

The storage connection unit may provide a user access mechanism for using the single virtual storage unit, and the user access mechanism may vary depending on the type of the single virtual storage unit.

The data manipulation unit may convert the data to be stored in the single virtual storage unit by performing at least one of fragmentation, encryption, and compression of the data, and may store the converted data.

Also, in order to accomplish the above objects, a method for managing integrated storage, performed by an apparatus for managing integrated storage, according to an embodiment of the present invention includes distributing data in order to store the data in integrated storage, including on-premises storage and cloud storage; managing storage by connecting to the integrated storage in order to store the data and providing information about storage tiering pertaining to the data to be stored; and managing the data by providing the integrated storage as virtual data storage regardless of the location at which the data is actually stored and by providing a user with an interface for the virtual data storage as a single virtual storage unit. Here, the information about storage tiering may vary depending on the performance of storage, the time during which the data is used, and the frequency with which the data is accessed.

Here, managing the data may be configured to provide a user access mechanism for using the single virtual storage unit, and the user access mechanism may vary depending on the type of the single virtual storage unit.

Here, managing the data may be configured to convert the data to be stored in the single virtual storage unit by performing at least one of fragmentation, encryption, and compression of the data and to store the converted data.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
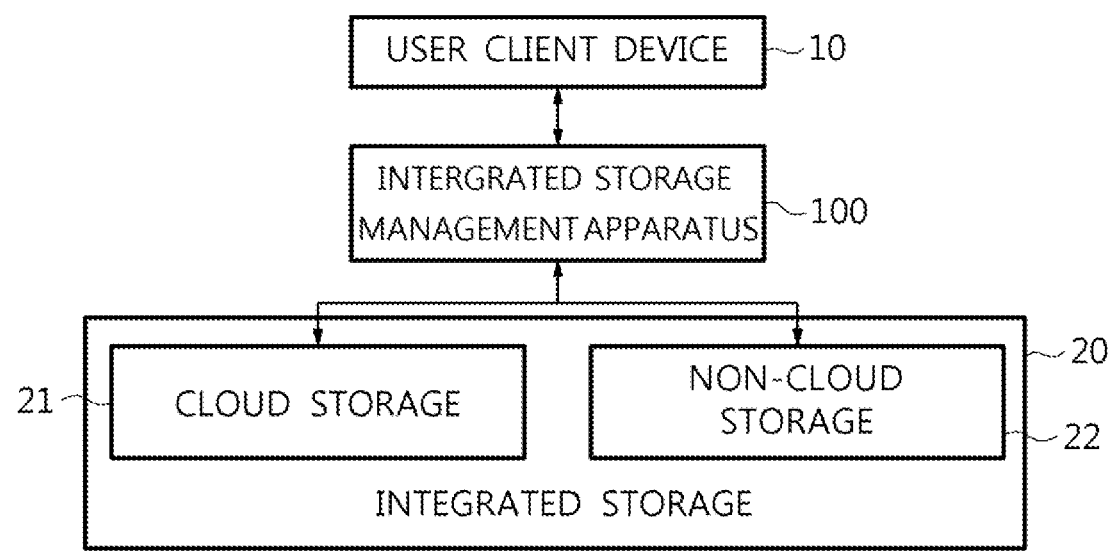
FIG. 1 is a block diagram that shows an integrated storage system according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a block diagram that shows an integrated storage system according to an embodiment of the present invention.

Referring to FIG. 1, an integrated storage system according to an embodiment of the present invention may include a user client device 10, an integrated storage management apparatus 100, and integrated storage 20.

The user client device 10 enables a user to request and receive the service of the integrated storage 20 using the integrated storage management apparatus 100.

The integrated storage 20 may include cloud storage 21 and non-cloud storage 22.

The cloud storage 21 may be public cloud storage provided by a cloud provider.

The non-cloud storage 22 may be on-premises storage possessed by companies and organizations.

The integrated storage management apparatus 100 may manage and operate the cloud storage 21 and the non-cloud storage 22 included in the integrated storage 20 as unified storage.

Here, the integrated storage management apparatus 100 may provide a cloud service with consistent performance so that a user may not be able to distinguish access to the cloud storage 21 from access to the non-cloud storage 22.

Figure 2:
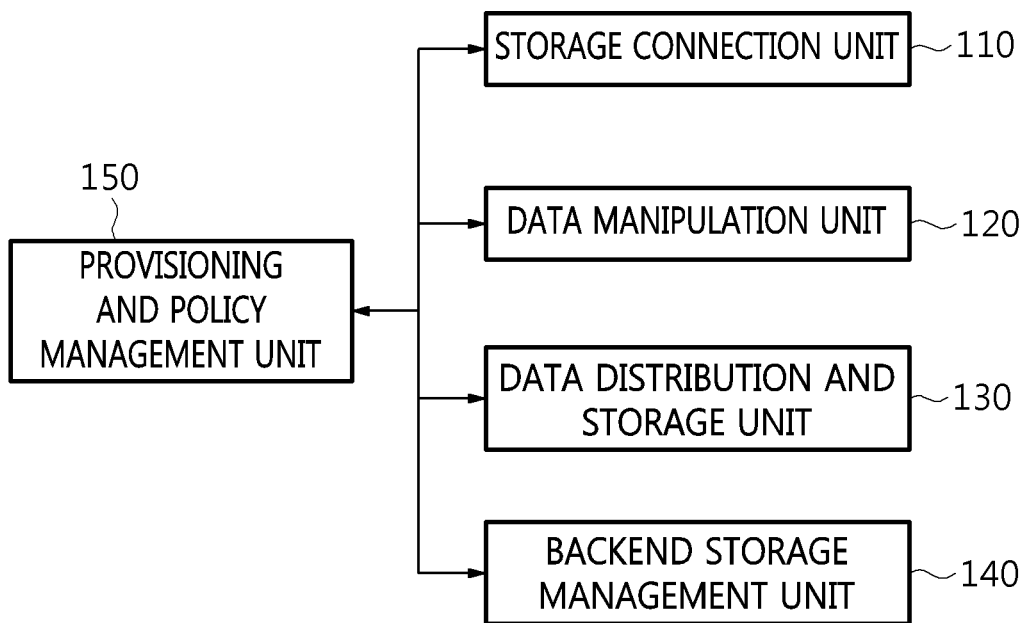
FIG. 2 is a block diagram that shows an apparatus for managing integrated storage according to an embodiment of the present invention.
Figure 3:
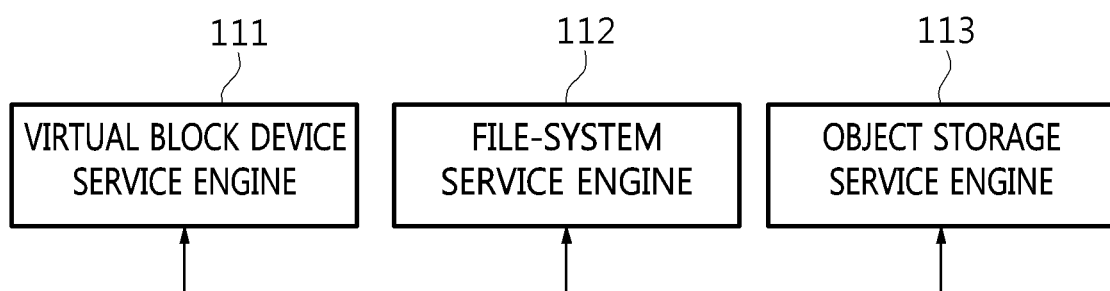
FIG. 3 is a block diagram that specifically shows an example of the storage connection unit illustrated in FIG. 2.
Figure 4:
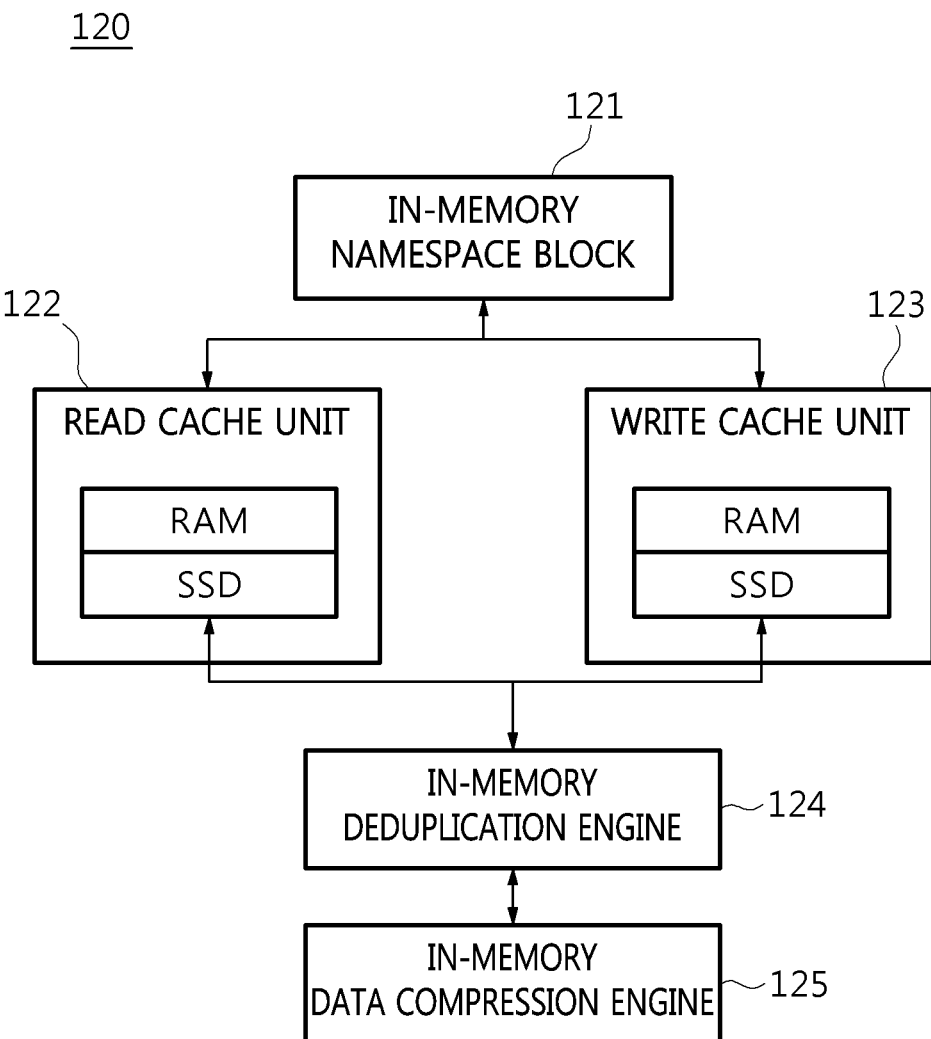
FIG. 4 is a block diagram that specifically shows an example of the data manipulation unit illustrated in FIG. 2.

FIG. 2 is a block diagram that shows an apparatus for managing integrated storage according to an embodiment of the present invention. FIG. 3 is a block diagram that specifically shows an example of the storage connection unit illustrated in FIG. 2. FIG. 4 is a block diagram that specifically shows an example of the data manipulation unit illustrated in FIG. 2.

Referring to FIG. 2, the integrated storage management apparatus 100 according to an embodiment of the present invention includes a storage connection unit 110, a data manipulation unit 120, a data distribution and storage unit 130, a backend storage management unit 140, and a provisioning and policy management unit 150.

The storage connection unit 110 may provide the service of the integrated storage 20 to a user by operating in conjunction with the integrated storage 20.

Referring to FIG. 3, the storage connection unit 110 may include a virtual block device service engine 111, a filesystem service engine 112, and an object storage service engine 113.

Here, the storage connection unit 110 may process the protocols of block storage, file storage, and object storage and may provide an I/O interface and an acceleration function for improving processing of the protocols.

Here, the storage connection unit 110 may basically provide a user with block-device and file-system services, which are conventional storage service interfaces, and may also provide an object storage interface, which has recently emerged.

The data manipulation unit 120 may provide a single storage view of the entire storage system by providing a virtual disk pool to a user.

That is, the data manipulation unit 120 may form a virtual disk pool using a fast storage resource, and may provide a user with storage devices as a virtual disk.

Therefore, even though data is physically distributed across various types of storage, a user may be provided with a single storage configuration regardless of the location at which the data is actually stored.

Here, the data manipulation unit 120 may provide data management functions, such as snapshots, fast replication, distributed transaction logs, and the like.

Here, the data manipulation unit 120 may provide a write buffer function or a read cache function to a user when a data write operation or a data read operation is performed.

Here, the data manipulation unit 120 may use memory, a Solid-State Drive (SSD), and a PCIe flash card to guarantee a fast response time to a user.

Here, the data manipulation unit 120 may provide a data read/write cache using a RAM disk in order to provide the service of the integrated storage.

The data manipulation unit 120 may provide the function of caching the data stored in public cloud storage, which is the cloud storage 21. Because data stored in the public cloud storage is transmitted over an Internet network, the data access speed is slower than that of on-premises storage, which is the non-cloud storage 22.

Also, because data is automatically distributed across public cloud storage in the state in which a user cannot recognize the distribution of the data, a function for quickly accessing data stored in the public cloud storage is required.

The data manipulation unit 120 caches data stored in the public cloud storage to a storage device within the cloud-integrated storage operating platform, whereby the data in the public cloud storage may be accessed at a speed close to the speed at which data in the on-premises storage is accessed.

Referring to FIG. 4, the data manipulation unit 120 may include an in-memory namespace block 121, a read cache unit 122, a write cache unit 123, an in-memory deduplication engine 124, and an in-memory data compression engine 125.

The in-memory namespace block 121 may store information that is periodically and repeatedly read and written in order to access actual data, and may guarantee high access speed.

Here, the in-memory namespace block 121 stores information that is necessary for access to data in high-speed main memory, thereby providing the function of storing and managing the data.

Here, the in-memory namespace block 121 is a volatile storage medium, and has a limited capacity. Therefore, the namespace block is backed up in real time, and the namespace block that is backed up may provide high availability through clustering of multiple nodes (virtual machines or physical servers).

Here, in order to provide fast performance of the integrated storage, the data manipulation unit 120 may use the in-memory namespace block 121 and run both the in-memory deduplication engine 124 and the in-memory data compression engine 125, which reduce the amount of data, in the in-memory block.

Here, the data manipulation unit 120 is required to guarantee a high speed when a global namespace for accessing actual data is accessed, and may provide a high-speed processing method in order to quickly write and read data.

Each of the read cache unit 122 and the write cache unit 123 is in the form of a RAM disk, and may be configured as a single disk, which includes RAM, corresponding to main memory, and a Solid-State Drive (SSD).

The read cache unit 122 and the write cache unit 123 may back up data in real time in the SSD because the RAM is volatile.

Here, when the RAM-based cache area is exhausted, the read cache unit 122 and the write cache unit 123 may automatically make the SSD-based cache area replace the RAM-based cache area.

Here, when a user writes data, the read cache unit 122 and the write cache unit 123 may return a result immediately after writing the data in a memory area for a fast response thereto.

The in-memory deduplication engine 124 and the in-memory data compression engine 125 may correspond to the data distribution and storage unit 130, which will be described later.

That is, the data distribution and storage unit 130 may be included in the data manipulation unit 120.

The in-memory deduplication engine 124 may provide the function of storing data in multiple physical devices in a distributed manner in order to prevent data loss.

Here, the in-memory deduplication engine 124 applies error detection and recovery code for detecting the occurrence of errors in data and correcting the errors, thereby responding to data and system errors.

The in-memory data compression engine 125 compresses actual data to be stored in the backend storage, thereby reducing the size of the data. Particularly, the in-memory data compression engine 125 reduces the size of the data to be stored in the public cloud storage through compression, thereby reducing the size of the data to be transmitted over a network.

The data distribution and storage unit 130 may provide an optimization function for the received data to be written such that the data may always be accessed with the minimum overhead.

Here, the data distribution and storage unit 130 breaks each object into multiple fragments in order to efficiently manage data, and may store the fragments in another node or a data center in a distributed manner in order to improve reliability.

Here, the data distribution and storage unit 130 may optionally encrypt or compress the data fragment and enact a policy decision therefor.

Here, the data distribution and storage unit 130 applies error detection and recovery code for detecting the occurrence of errors in data and correcting the errors, thereby responding to data and system errors.

The backend storage management unit 140 may provide a storage interface of the cloud storage 21 and the non-cloud storage 22 in order to store data created in the data distribution and storage unit 130 in the final resource.

Here, the backend storage management unit 140 may provide the function of automatically or manually storing data using storage tiering based on performance, time, and the frequency of use according to the policy of distributed storage tiers.

Here, the backend storage management unit 140 may provide the function of automatically distributing and storing data in various storage tiers.

Here, the backend storage management unit 140 may tier various types of storage based on the characteristics of the provided storage.

Here, the backend storage management unit 140 may initially store created data in high-speed storage, move the data to a lower tier of storage when the data is less frequently accessed, and finally store the data in the public cloud storage.

Here, the backend storage management unit 140 may automatically move data between various tiers of storage depending on the characteristics of the data.

The provisioning and policy management unit 150 may manage the respective tiers and a user-based policy. Here, the provisioning and policy management unit 150 may provide a hierarchical interface for disk provisioning requested by a user.

Here, metadata is necessary in order to manage and access the data stored in the backend storage. The metadata of the present invention may include client metadata, data operation metadata required for data operations, and storage management metadata for backend storage. Here, the client metadata is created when a user uses the client device 10 and is required for an interface between the user client device 10 and the integrated storage management apparatus 100.

Figure 5:
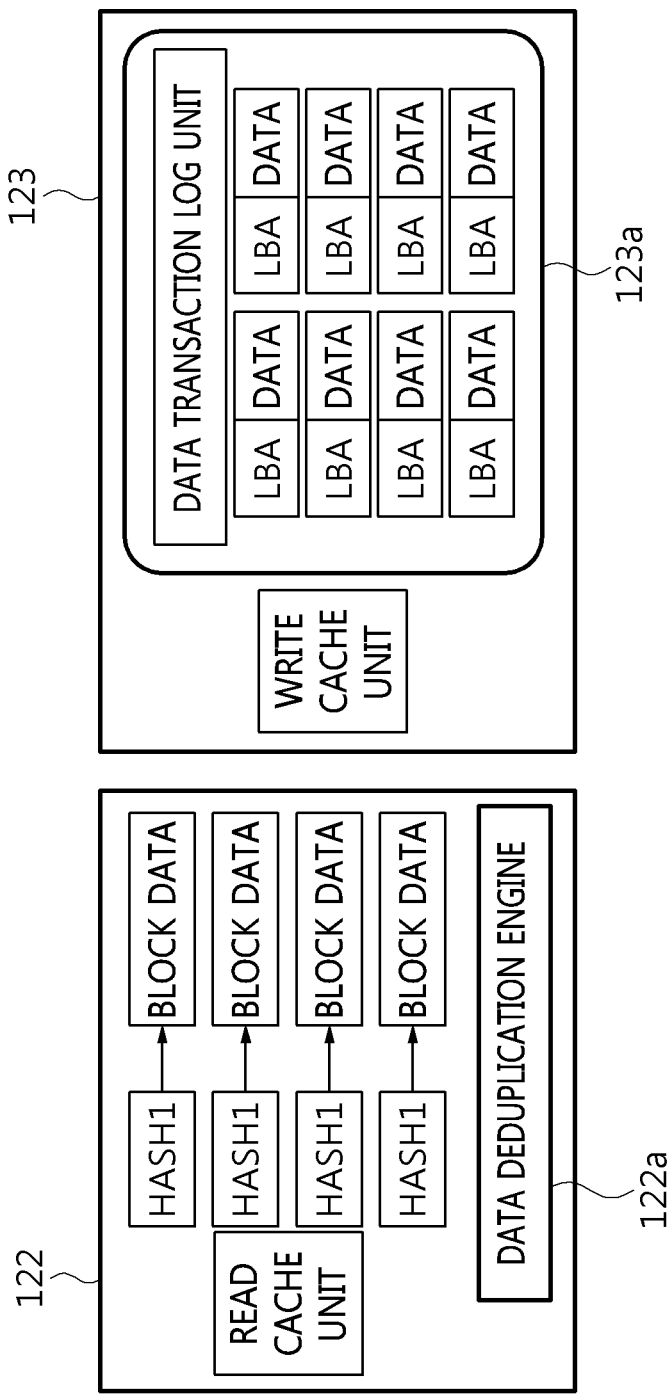
FIG. 5 is a view that shows an example of a RAM disk according to an embodiment of the present invention.

FIG. 5 is a view that shows an example of a RAM disk according to an embodiment of the present invention.

Referring to FIG. 5, the read cache unit 122 and the write cache unit 123, which are the RAM disk of the data manipulation unit 120, are specifically illustrated.

The read cache unit 122 breaks data into multiple pieces of block data depending on hashes using a data deduplication engine 122*a*.

The write cache unit 123 manages a log for data recovery in the same node or another node connected therewith over a network using a data transaction log unit 123*a* in preparation for the case in which data stored in a write cache is lost due to system failure.

A log may save the location of data in a certain block and the hash value thereof, and may be maintained until the data is stored in backend storage.

The write cache may be synchronized with the transaction log node when a log queue reaches a certain size, or when a certain time is exceeded, or whenever data is generated in response to a request to write the data. The block located in the write cache may be synchronized to the transaction log node under a certain condition. When data in the corresponding block is stored in the backend storage, the block in the write cache and the block in the transaction log node may be deleted therefrom because the data is removed from data to be managed.

Figure 6:
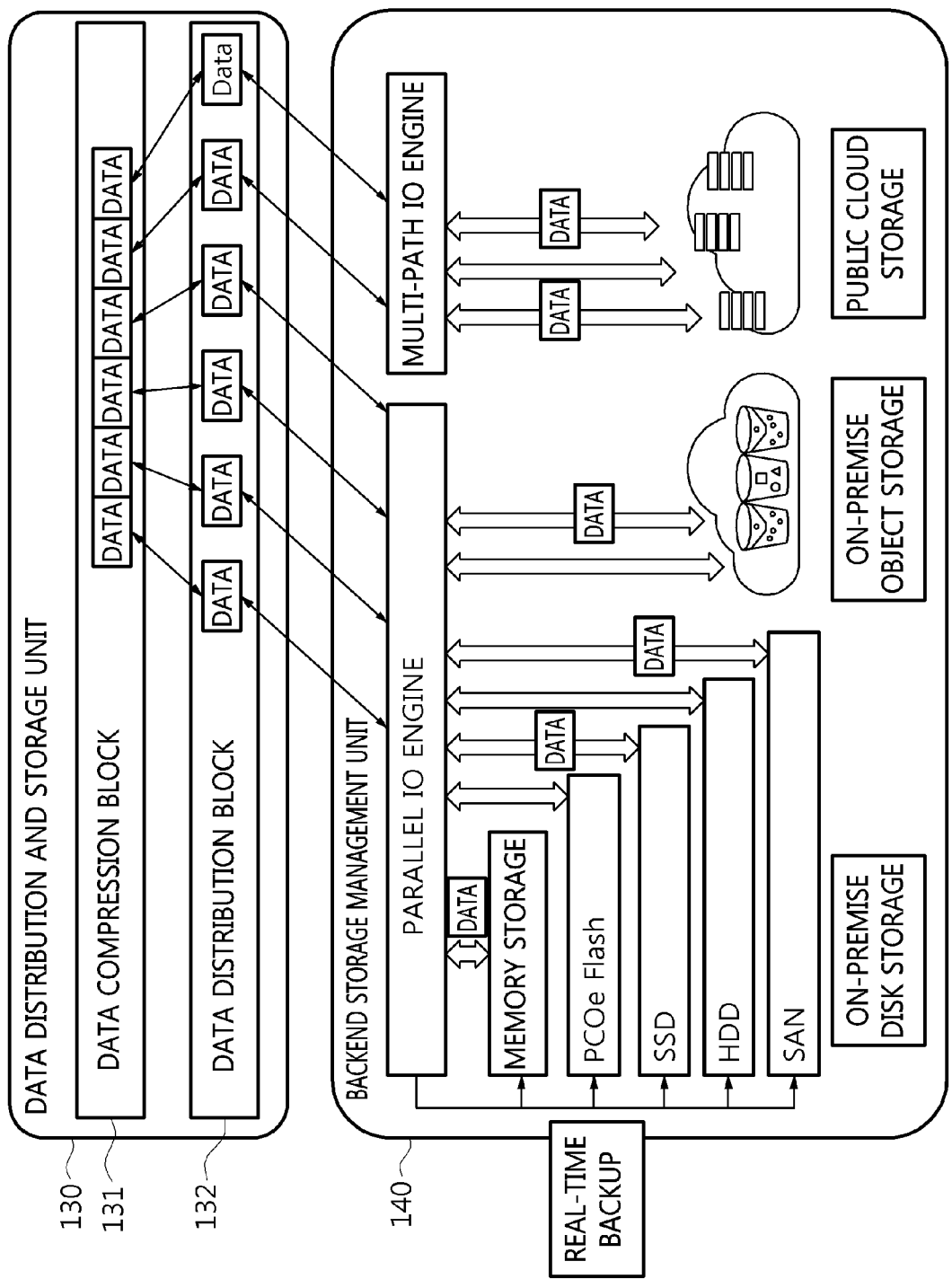
FIG. 6 is a view that specifically shows the operations of a data distribution and storage unit and a backend storage management unit according to an embodiment of the present invention.

FIG. 6 is a view that specifically shows the operations of a data distribution and storage unit and a backend storage management unit according to an embodiment of the present invention.

Referring to FIG. 6, the data compression block 131 of the data distribution and storage unit 130 compresses the actual data to be stored in the backend storage, thereby reducing the size of the data. Particularly, the data compression block 131 reduces the size of the data to be stored in the public cloud storage through compression, thereby reducing the size of the data to be transmitted over a network.

The data distribution block 132 may provide the function of storing data in multiple physical devices in a distributed manner in order to prevent data loss.

Here, the data distribution block 132 applies error detection and recovery code for detecting the occurrence of errors in data and correcting the errors, thereby responding to data and system errors.

The backend storage management unit 140 may include a Hard Disk Drive (HDD), Serial Attached SCSI (SAS) storage, iSCSI storage, public cloud storage, and the like, and may provide an interface for finally storing data in the backend storage.

Here, the backend storage management unit 140 uses various types of storage, ranging from memory storage for guaranteeing fast response time to cloud storage for managing a large volume of data, through a data distribution strategy, a parallel I/O engine, and a multi-path I/O engine, thereby providing a high-availability service related to the connected storage and data management.

Here, the backend storage management unit 140 may store data in storage in the same node or storage in multiple nodes configured as a cluster such that the data is distributed, and may adjust the data size and the number of nodes across which the data is distributed, whereby data loss caused by system errors may be prevented.

The backend storage management unit 140 provides the function of automatically distributing and storing data in various tiers of storage. Here, based on the characteristics of the provided storage, various types of storage may be tiered. Initially, created data is stored in high-speed storage, data is moved to a lower tier of storage when the data is less frequently accessed, and the data is finally stored in the public cloud storage. The backend storage management unit 140 may automatically move data between various tiers of storage depending on the characteristics of the data.

Figure 7:
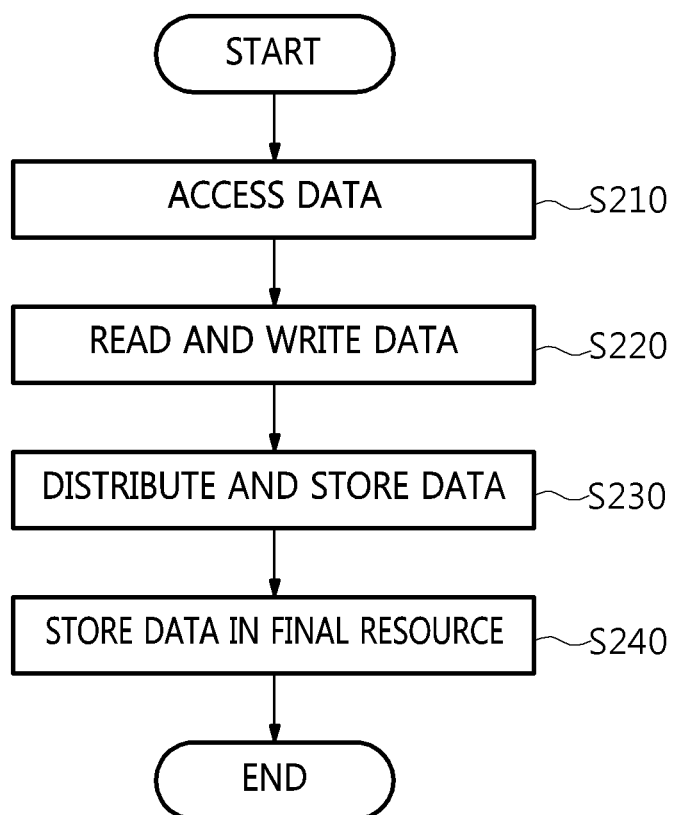
FIG. 7 is a flowchart that shows a method for managing integrated storage according to an embodiment of the present invention.

FIG. 7 is a flowchart that shows a method for managing integrated storage according to an embodiment of the present invention.

Referring to FIG. 7, in the method for managing integrated storage according to an embodiment of the present invention, first, data may be accessed at step S210.

That is, data may be accessed at step S210 in order to provide the service of integrated storage 20.

Here, at step S210, a virtual disk pool is provided to a user, whereby a single storage view of the entire storage system may be provided.

Also, in the method for managing integrated storage according to an embodiment of the present invention, data may be read or written at step S220.

That is, at step S220, a data read/write cache may be provided using a RAM disk in order to provide the service of the integrated storage.

Here, at step S220, data stored in the public cloud storage is cached to a storage device within the cloud-integrated storage operating platform, whereby the data in the public cloud storage may be accessed at a speed close to the speed at which data in on-premises storage is accessed.

Here, at step S220, data read and write operations are performed using a RAM disk configured as a single disk, which includes RAM, corresponding to main memory, and an SSD. Here, when the RAM-based cache area is exhausted, the SSD-based cache area may automatically replace the RAM-based cache area.

Also, in the method for managing integrated storage according to an embodiment of the present invention, data may be distributed and stored at step S230.

That is, at step S230, the object of the data may be distributed and stored, and the distributed object may be encrypted and compressed.

Here, at step S230, error detection and recovery code for detecting the occurrence of errors in data and correcting the errors is applied, whereby it is possible to respond to data and system errors.

Also, in the method for managing integrated storage according to an embodiment of the present invention, data may be stored in the final resource at step S240.

That is, at step S240, the final data created at step S230 may be stored in the final resource.

Here, at step S240, the function of automatically or manually storing data may be provided using storage tiering based on performance, time, and the frequency of use according to the policy of distributed storage tiers.

Here, at step S240, the function of automatically distributing and storing data in various tiers of storage may be provided.

Here, at step S240, various types of storage may be tiered based on the characteristics of the provided storage.

Here, at step S240, created data is initially stored in high-speed storage, the data is moved to a lower tier of storage when the data is less frequently accessed, and the data may be finally stored in the public cloud storage.

Here, at step S240, data may be automatically moved between various tiers of storage depending on the characteristics of the data.

Figure 8:
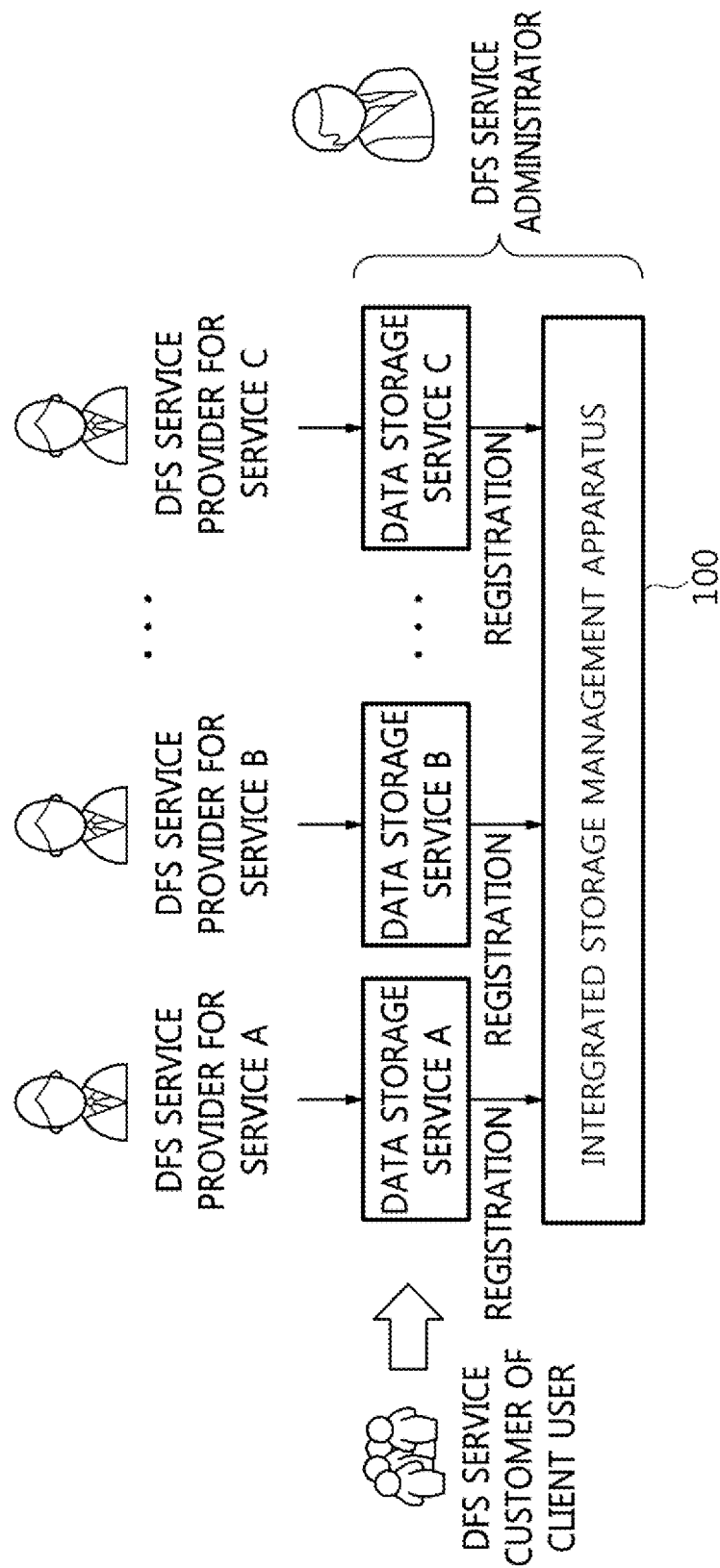
FIG. 8 is a view that shows the relationship between a service provider and an apparatus for managing integrated storage according to an embodiment of the present invention.

FIG. 8 is a view that shows the relationship between a service provider and an apparatus for managing integrated storage according to an embodiment of the present invention.

Referring to FIG. 8, the integrated storage management apparatus 100 according to an embodiment of the present invention may enable multiple Data Storage Federation (DSF) service providers to register their data storage services A to N in the integrated storage management apparatus 100.

Here, a DSF service administrator may provide the registered multiple storage services to users through the integrated storage management apparatus 100.

Here, DSF service customers, that is, clients or users, may be provided with the multiple storage services using the integrated storage management apparatus 100.

Here, the integrated storage management apparatus 100 may manage integrated storage 20 based on multi-tenant architecture in order to provide multiple storage services.

Figure 9:
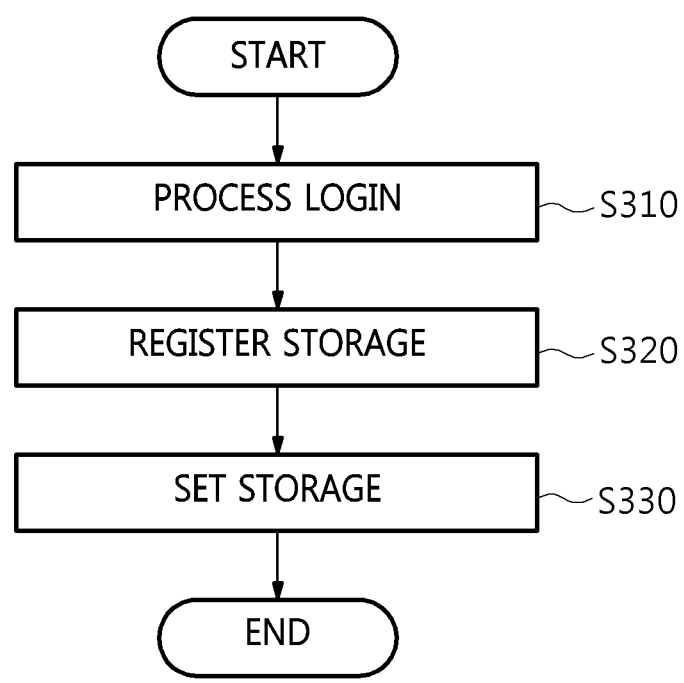
FIG. 9 is a flowchart that shows an integrated storage management method for registering a storage service according to an embodiment of the present invention.

FIG. 9 is a flowchart that shows an integrated storage management method for registration of a storage service according to an embodiment of the present invention.

Referring to FIG. 9, in the integrated storage management method for registration of a storage service according to an embodiment of the present invention, first, the integrated storage management apparatus 100 may process the login of a provider at step S310.

Here, at step S310, in order to register a storage service, the provider may log on to the integrated storage management apparatus 100 using his or her ID and password, which have been registered in advance.

Here, at step S310, if the ID and password of the provider are not registered, a new ID and password may be created.

Also, in the integrated storage management method for registration of a storage service according to an embodiment of the present invention, a storage service may be registered in the storage at step S320.

That is, at step S320, cloud storage 21 and non-cloud storage 22 are checked in order to register a storage service, and the storage service may be registered.

Here, at step S320, a registration method may be provided to the provider using a GUI so that the provider may easily register a storage service.

Here, at step S320, a storage service name, the specifications of storage (the size, whether caching is supported, the number of tiers, whether encryption is supported, whether on-premises storage is supported, and the like), a data storage service protocol, the name and type of cloud storage, and the like are input by the provider via the GUI, and the service may be registered in the storage corresponding to the input information.

Here, the information input via the GUI may be registered in advance when a new provider registers his or her ID and password.

Also, in the integrated storage management method for registration of a storage service according to an embodiment of the present invention, storage may be configured at step S330.

That is, at step S330, virtual storage corresponding to the storage in which the storage service is registered may be created.

Here, at step S330, the virtual storage may be registered in a virtual disk pool. Using the virtual disk pool, a single storage view for providing a storage service may be provided to users.

Figure 10:
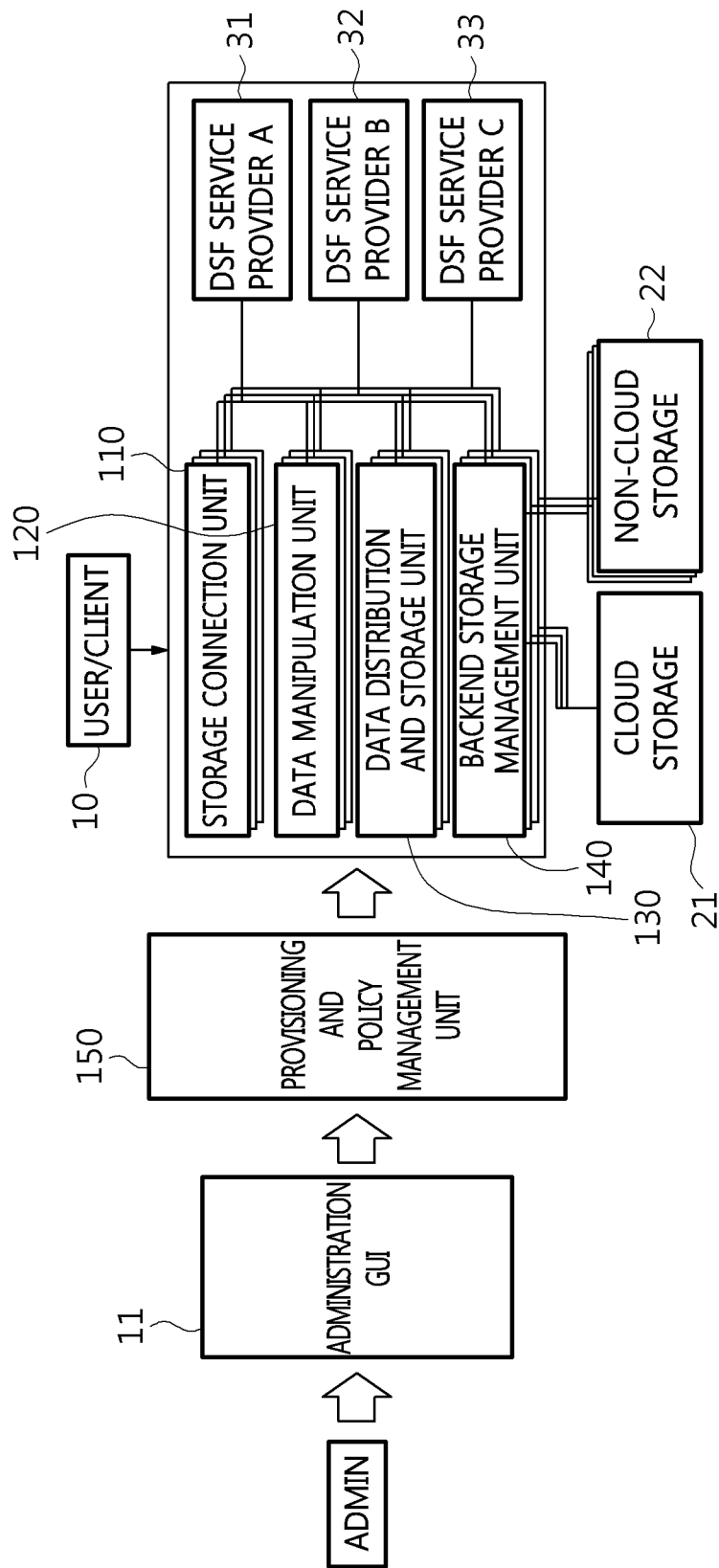
FIG. 10 is a block diagram that shows an apparatus for managing integrated storage according to an embodiment of the present invention.

FIG. 10 is a block diagram that shows an apparatus for managing integrated storage according to an embodiment of the present invention.

Referring to FIG. 10, the apparatus for managing integrated storage according to an embodiment of the present invention is configured as multi-tenant storage by including as many storage connection units 110, as many data manipulation units 120, as many data distribution and storage units 130, and as many backend storage management units 140 as the number of storage services registered by DSF service providers A to C. Here, the respective units become the components of each layer or main components of the integrated storage management apparatus 100.

That is, the integrated storage management apparatus 100 may support a multi-tenant function for simultaneously performing multiple services.

Here, a provisioning and policy management unit 150 may provide an administration GUI to an administrator, and may provide and manage a multi-tenant integrated storage service.

The storage connection unit 110 and the data manipulation unit 120 may perform data management.

Here, the storage connection unit 110 may provide a user with an interface for using the virtual data storage as a single virtual storage unit.

Here, the storage connection unit 110 may provide a user access mechanism for using the single virtual storage unit.

Here, the user access mechanism may vary depending on the type of the single virtual storage unit.

Here, the storage connection unit 110 may provide the protocols and I/O interfaces of a single virtual volume with a virtual block device, a file system, and object storage.

Here, the storage connection unit 110 may provide an acceleration function for improving processing of the protocols.

Also, the interface provided by the storage connection unit 110 may be a direct interface (that is, an object storage interface or a block storage interface) or a proxy interface that configures various types of storage interfaces with a software program.

Here, the software program may include a software agent, a daemon, a web worker, and a RESTful API for an interface with the integrated storage 20.

Here, the proxy interface may automatically detect an interface with a software program and connect the integrated storage 20 therewith.

Here, the storage connection unit 110 may provide a user interface for enabling the user client device 10 to use a single virtual volume.

The user interface may include a Graphical User Interface (GUI), a web application, or a specific client through which the user client device 10 may access a specific virtual volume.

Here, the storage connection unit 110 may provide translation between the data manipulation unit 120 and the interface of the integrated storage 20.

The interface includes an API, an I/O interface, and the like.

Here, the storage connection unit 110 may provide the user client device 10 with a secure access mechanism for using a single virtual volume.

Here, the storage connection unit 110 may register the requirements of the user client device 10.

The requirements of the user client device 10 may include a data storage capacity, an access mechanism, the storage type of a single virtual volume, policies, and the like.

Here, the storage connection unit 110 may provide a seamless connection with the interface of the integrated storage 20 in order to communicate with the integrated storage 20.

Here, the data manipulation unit 120 may provide the integrated storage 20 as virtual data storage regardless of the location at which data is actually stored.

Here, the data manipulation unit 120 may convert the data to be stored in the single virtual storage unit by performing at least one of fragmentation, encryption, and compression of the data, and may then store the converted data.

Here, the data manipulation unit 120 may provide the single virtual storage view of the integrated storage 20 as a virtual storage pool.

Here, the data manipulation unit 120 may provide a write buffer function or a read cache function to the user client device 10.

Here, the data manipulation unit 120 may reduce a read response time and a write response time using memory, an SSD, a Peripheral Component Interconnect express (PCIe) flash card, and the like.

Here, the data manipulation unit 120 may use read and write caches in order to compensate for the fact that the access speed is slower than that in the on-premises storage.

The read and write caches may improve the performance of storage and a device for storing data, and various devices for high-speed cache operations may be used.

The various devices for fast cache operations may correspond to main memory, a RAM-based disk, an SSD, and the like.

For high-speed access, the cache hierarchy may be extended to main memory. Also, due to the limited capacity of main memory, an approach in which an SSD is used along with the main memory may be used. That is, when the RAM-based cache area is exhausted, an SSD-area cache may automatically supplement the RAM-based cache area. When the user client device 10 performs a write operation, the write operation may be performed in the memory area for a fast response to the write operation.

Here, the data manipulation unit 120 may provide data management for snapshots, fast replication, and distributed transaction logs.

Here, the data manipulation unit 120 may perform operations such as creating, reading, updating, and deleting data (CRUD data operations) for the user client device 10.

The CRUD data operations may include creating, reading, updating and deleting data.

Here, the data manipulation unit 120 may provide the user client device 10 with a data retrieval function using a query to search a global registry.

Here, the data manipulation unit 120 checks whether DSF data is shared, and updates a data-sharing state in the global registry, thereby providing a shared data operation.

Data sharing may mean that data may be shared during the manipulation of the data.

The data-sharing state may be information about whether data is shared.

Here, the data manipulation unit 120 may save data storage space through data deduplication.

Here, the data manipulation unit 120 may provide data encryption and decryption in order to transmit data to the integrated storage 20.

Here, the data manipulation unit 120 may provide recovery of the data of the user client device 10 when a system failure occurs.

Data recovery is configured to reconstruct the most recently used data of the user client device 10, whereby data loss due to storage and network connection errors may be prevented.

Here, the data manipulation unit 120 may provide migration of data to the available integrated storage 20 for the resilience and cost efficiency of the storage space.

Data migration for the resilience and cost efficiency of the data storage space may be automatically performed without user intervention or in the state in which a user cannot recognize data migration.

Here, in order to check data integrity, the data manipulation unit 120 may check the validity of data after the data is manipulated.

Here, the data manipulation unit 120 may support data consistency for the data replicated from the user client device 10.

Data consistency may indicate that the data manipulation unit 120 correctly backs up the current data in order to reconstruct the data of the user client device 10 in the event of a failure.

Here, the data manipulation unit 120 may provide data transparency for the user client device 10.

Data transparency may mean access to the data of the user client device 10 without knowing the location thereof.

Here, the data manipulation unit 120 may provide the backup of a global namespace for high availability.

The backup of the global namespace is synchronized with actual data, and the global namespace that is backed up may provide a high-availability function through clustering of multiple nodes (virtual computers or physical servers).

Here, the data manipulation unit 120 may add a single virtual volume in response to user requirements for block-based storage, file-based storage or other cloud storage.

The data distribution and storage unit 130 may perform data distribution.

Here, the data distribution and storage unit 130 may distribute data in order to store the data in the integrated storage 20, which includes on-premises storage and cloud storage.

Here, the data distribution and storage unit 130 may provide optimization for ensuring minimum overhead while data is being written to the integrated storage 20.

Here, the data distribution and storage unit 130 may perform data fragmentation in order to distribute and store data in the integrated storage 20.

Data fragmentation is a method for distributing and storing user data in other storage, nodes, or data centers in order to efficiently manage the data and improve reliability.

Here, the data distribution and storage unit 130 may provide encryption, decryption, compression, and decompression of data.

Here, encryption and compression of data may be considered depending on user requirements.

Also, the data distribution and storage unit 130 may support a file itself and the content thereof as data.

The type of file content may be any one of structured data, semi-structured data, and unstructured data.

Here, the data distribution and storage unit 130 may support aggregation of data distributed across local storage devices of the multiple providers of integrated storage 20 using corresponding APIs.

Here, the data distribution and storage unit 130 may manage the data of the user client device 10 with a focus on the resilience and cost efficiency of the storage space.

For example, data movement for the resilience and cost efficiency of the data storage space may be automatically performed without user intervention or in the state in which a user cannot recognize the data movement.

Here, the user client device 10 may be provided with the integrated cloud storage service with the same performance without knowing whether data is stored in the on-premises storage 22 or the cloud storage 21.

Here, the data distribution and storage unit 130 may verify a service provider in order to federate the data of the user client device 10.

The backend storage management unit 140 may perform storage management.

Here, the backend storage management unit 140 may connect to the integrated storage 20 in order to store the distributed data, and may provide information about storage tiering pertaining to the data to be stored.

Here, the information about storage tiering may vary depending on the performance of the storage, the time during which the data is used, and the frequency with which the data is accessed.

Here, the backend storage management unit 140 may provide storage tiering for tiering data depending on the performance of the storage, the time during which the data is used, and the frequency with which the data is accessed.

Storage tiering may be the process of distributing data across multiple storage tiers using a hierarchical method.

Here, the backend storage management unit 140 may automatically move data between various storage tiers depending on the characteristics of the data.

When data is initially created, the data may be stored in high-speed storage. When the data is less frequently accessed, the data may be moved to low-speed storage.

Here, the backend storage management unit 140 may simultaneously access multiple data storage providers in order to aggregate distributed data.

Here, the backend storage management unit 140 may support the function of delegating privileges for accessing the integrated storage 20 to the user client device 10.

The provisioning and policy management unit 150 may provide the configuration and control of logical components.

Here, the provisioning and policy management unit 150 may provide policy management related to data storage and data manipulation.

The data storage policy may include backups, snapshots, scaling, recovery, data caching, thin provisioning, tiering, storage types (a file, a block, an object, and the like), and the like.

Here, a default data storage policy may be provided, and the data storage policy may be reconfigured in response to a user request. Also, the data storage policy may be dependent on the policy for the integrated storage 20.

The reconfigured policy is the policy reconfigured by the provisioning and policy management unit 150 when the integrated storage 20 does not support its own policy.

The data manipulation policy may include information about whether data sharing is supported, read/write operations, replication, data migration, data fragmentation, encryption, compression, deduplication, and the like.

Here, in the data manipulation policy, a non-sharing mode or a sharing mode, including options such as read-only, writing, replication and the like, may be selected.

Here, the provisioning and policy management unit 150 may provide a single virtual volume to the virtual storage pool.

Here, the provisioning and policy management unit 150 may guarantee the confidentiality of the data of the user client device 10 by supporting a security policy (for example, data encryption) for data transmission.

Here, the provisioning and policy management unit 150 may prevent data loss, caused due to errors from the storage structure based on storage of data in a distributed manner, and may support data recovery in the event of a system error.

Also, the provisioning and policy management unit 150 may share data operation metadata with the storage connection unit 110, the data manipulation unit 120, the data distribution and storage unit 130, and the backend storage management unit 140.

The data operation metadata is a description that is necessary for data operations. The data operation metadata may include the attributes of a virtual storage pool and a single virtual volume. The data operation metadata may include transaction logs related to read/write caching, snapshots, replication, fragmentation, and the like, and DSF data attributes.

The backend storage management unit 140 may share storage management metadata with the cloud storage 21 and the non-cloud storage 22 of the integrated storage 20.

The storage management metadata is a description that is necessary in order to manipulate a storage area. The storage management metadata may include information about the location of the integrated storage 20, the interface thereof, an API for manipulating customer data, a read/write speed, a storage capacity, and the like.

The customer metadata may be created by a customer in order to configure a customer environment.

Figure 11:
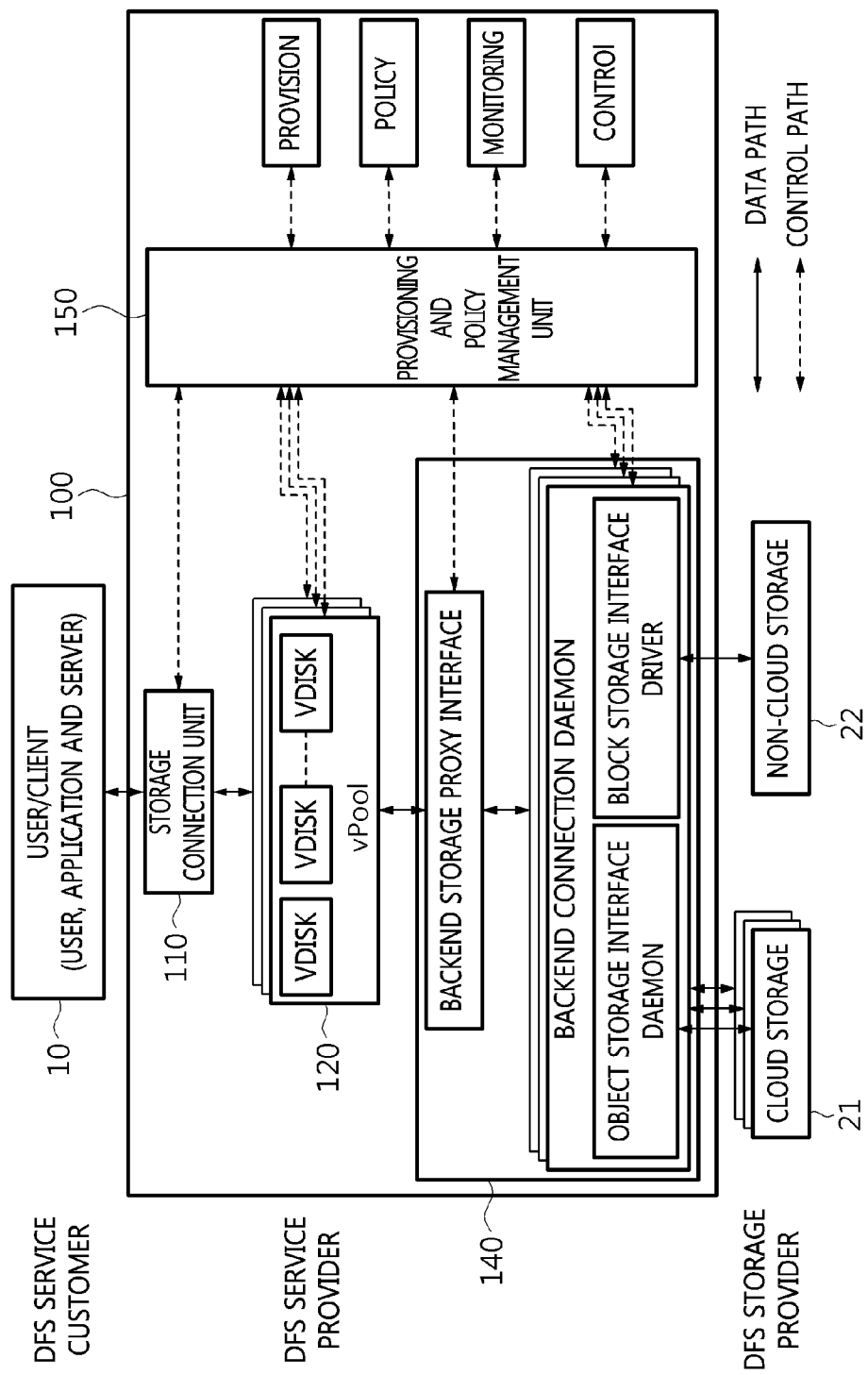
FIG. 11 is a block diagram that shows a multi-tenant-based integrated storage management apparatus using a backend connection daemon according to an embodiment of the present invention.

FIG. 11 is a block diagram that shows a multi-tenant-based integrated storage management apparatus using a backend connection daemon according to an embodiment of the present invention.

Referring to FIG. 11, the multi-tenant-based integrated storage management apparatus using a backend connection daemon according to an embodiment of the present invention includes a single provisioning and policy management unit 150, multiple storage connection units 110, multiple data manipulation units 120, multiple data distribution and storage units 130, and multiple backend storage management units 140. Here, the multiple storage connection units 110, the multiple data manipulation units 120, the multiple data distribution and storage units 130, and the multiple backend storage management units 140 are provided for respective storage services provided by service providers 31, 32 and 33.

The storage connection unit 110 may provide the storage service of integrated storage 20 by operating in connection with the integrated storage 20.

Here, the integrated storage 20 may include non-cloud storage 22 and at least one cloud storage unit 21.

The data manipulation unit 120 may create a virtual disk pool of the integrated storage 20, thereby providing a single storage view using at least one virtual disk.

The data distribution and storage unit 130 may provide a data distribution and encryption function such that the received data to be written may always be accessed with the minimum overhead.

The backend storage management unit 140 may interface with the integrated storage 20 using a connection daemon in the form of software.

Here, the backend storage management unit 140 may include an interface for storage (an object storage interface or a block storage interface) and a backend connection daemon configured to interface with various types of storage, and may provide a proxy interface for easy registration of multiple storage devices.

Here, the proxy interface of the backend storage management unit 140 may register a cloud service by detecting the storage area interface of the first daemon, which is connected to the cloud storage 21, or of the second daemon, which is connected to the non-cloud storage 22.

The backend storage proxy may register a service in such a way that the backend connection daemon, which stores an object storage interface daemon or a block storage interface driver therein, automatically detects the storage area interface.

For connection with the integrated storage 20, the backend connection daemon may be run through a virtual machine or a container, excluding a block device, whereby the connection with object storage may be made.

Here, the backend storage management unit 140 may output information about the connected storage as storage in which a storage service may be registered.

Here, the backend storage management unit 140 may manage information for access by a user to a system and provide a secure path for access for registration of a storage service.

Here, the backend storage management unit 140 may create a backend connection daemon whenever a single storage device is connected therewith, and may connect the backend connection daemon with a proxy server. The proxy server (not illustrated) may store and manage data of a user using a driver interface that is connected with a virtual disk pool (vPool) through the data manipulation unit 120.

Accordingly, the integrated storage management apparatus 100 may create a single virtual disk (Vdisk) when a registered service provider connects to the integrated storage management apparatus 100, and the created virtual disk may be managed in the virtual disk pool. Here, using the individual virtual disk pool, a user may be provided with multiple storage services from the storage in which the storage services are registered.

The provisioning and policy management unit 150 may manage the provision of storage services based on multi-tenant architecture by accepting registration of the storage services from multiple service providers.

Here, the provisioning and policy management unit 150 enables an administrator to register cloud storage 21 and non-cloud storage 22 for providing a storage service and to configure a new service in the integrated storage management apparatus 100 using an administration GUI.

Here, when a service provider signs up for the service and uploads and creates a file, the provisioning and policy management unit 150 may create a cloud account, and the uploaded file may be stored in the cloud storage 21 or non-cloud storage 22 at the discretion of the administrator.

Here, the provisioning and policy management unit 150 may also provide the function of displaying, writing, modifying and deleting the content of a cloud service registered in the cloud storage 21 and the non-cloud storage 22, which are integrated into the integrated storage 20, using the administration GUI.

Separately from the non-cloud storage 22, the service of the cloud storage 21 may be provided along with the basic configuration thereof.

Here, the provisioning and policy management unit 150 may configure the functions of logical components as individual servers, virtual systems, or containers having a connection network by taking the form of a module or function having each of the logical component functions.

Here, the provisioning and policy management unit 150 may register the storage service in a storage device that matches service registration information input by a service provider, among the storage devices included in the integrated storage 20.

Here, the provisioning and policy management unit 150 may provide the storage service by configuring virtual storage in the storage in which the storage service is registered.

Here, the provisioning and policy management unit 150 may manage the storage service using a first path, which is a data path along which data is moved, and a second path, which is a control path for controlling data, in order to prevent the I/O performance of the storage service from being degraded.

Figure 12:
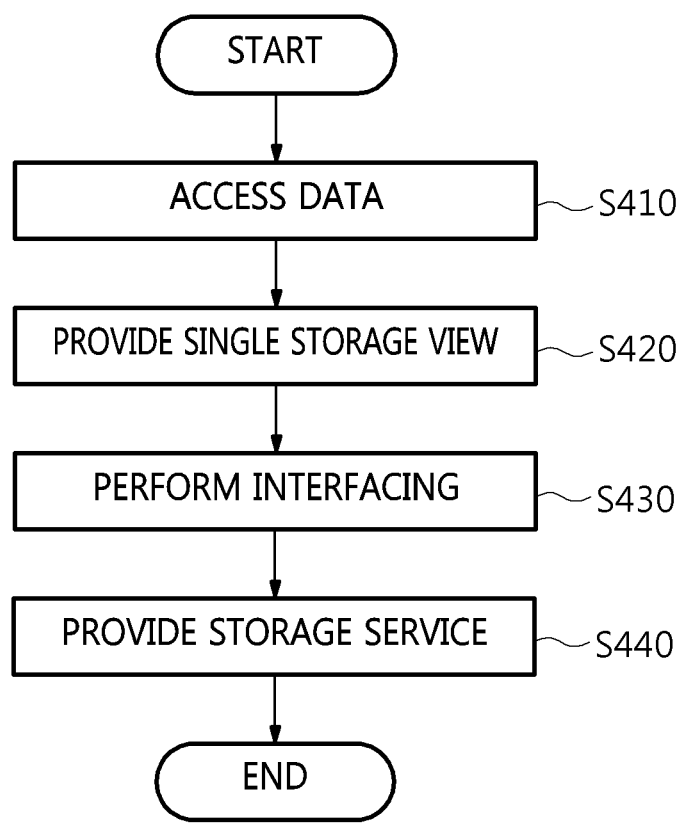
FIG. 12 is a flowchart that shows a multi-tenant-based integrated storage management method for providing a storage service according to an embodiment of the present invention.

FIG. 12 is a flowchart that shows a multi-tenant-based integrated storage management method for providing a storage service according to an embodiment of the present invention.

Referring to FIG. 12, in the multi-tenant-based integrated storage management method according to an embodiment of the present invention, first, data may be accessed at step S410.

That is, in order to provide a user with the storage service of integrated storage 20, data may be accessed at step S410.

Here, the integrated storage 20 may include non-cloud storage 22 and at least one cloud storage unit 21.

In the multi-tenant-based integrated storage management method according to an embodiment of the present invention, a single storage view may be provided at step S420.

That is, at step S420, a virtual disk pool of the integrated storage 20 is created, whereby a single storage view may be provided using at least one virtual disk.

Here, at step S420, a data distribution and encryption function may be provided such that the received data to be written is accessed always with the minimum overhead.

Also, in the multi-tenant-based integrated storage management method according to an embodiment of the present invention, interfacing is performed at step S430.

That is, at step S430, interfacing with the integrated storage 20 may be performed using a connection daemon in the form of software.

Here, at step S430, an interface for storage (an object storage interface or a block storage interface), a backend connection daemon configured to interface with various types of storage, and a proxy interface for easy registration of multiple storage devices may be provided.

Here, at step S430, the proxy interface may register a cloud service by detecting the storage area interface of the first daemon, which is connected with the cloud storage 21, and of the second daemon, which is connected with the non-cloud storage 22.

The backend storage proxy may register a service in such a way that the backend connection daemon, which stores an object storage interface daemon or a block storage interface driver therein, automatically detects the storage area interface.

For connection with the integrated storage 20, the backend connection daemon may be run through a virtual machine or a container, excluding a block device, whereby the connection with object storage may be made.

Here, at step S430, information about the connected storage may be output as storage in which a storage service may be registered.

Here, at step S430, information for access by a user to a system may be managed, and a secure path for access for registration of a storage service may be provided.

Here, at step S430, a single backend connection daemon may be created whenever a single storage device is connected, and the backend connection daemon may be connected with a proxy server. The proxy server may store and manage data of a user using a driver interface connected with a virtual disk pool through the data manipulation unit 120.

Accordingly, the integrated storage management apparatus 100 may create a single virtual disk in response to access by a registered service provider thereto, and the created virtual disk may be managed in the virtual disk pool. Here, using the individual virtual disk pool, a user may be provided with multiple storage services from the storage in which the storage services are registered.

Also, in the multi-tenant-based integrated storage management method according to an embodiment of the present invention, a storage service may be provided at step S440.

That is, at step S440, the provision of a storage service may be managed based on multi-tenant architecture by accepting registration of storage services from multiple service providers.

Here, at step S440, an administrator may register cloud storage 21 and non-cloud storage 22 for providing a storage service in the integrated storage management apparatus 100 and configure a new service using an administration GUI.

Here, at step S440, when a service provider signs up for the service and uploads and creates a file, a cloud account may be created, and the uploaded file may be stored in the cloud storage 21 or the non-cloud storage 22 at the discretion of the administrator.

Here, at step S440, the function of displaying, writing, modifying and deleting content of a cloud service registered in the cloud storage 21 and the non-cloud storage 22, which are integrated into the integrated storage 20, may be provided using the administration GUI.

In the configuration of storage, the service of the cloud storage 21 may be provided along with the basic configuration thereof, separately from the non-cloud storage 22.

Here, at step S440, the individual functions of logical components may be configured as servers, virtual systems, or containers having a connection network by implementing modules or functions having the respective logical component functions.

Here, at step S440, the storage service may be registered in a storage device that matches service registration information input by the service provider, among the storage devices included in the integrated storage 20.

Here, at step S440, the storage service may be provided by configuring virtual storage in the storage device in which the storage service is registered.

Here, the storage service may be managed using a first path, which is a data path along which data is moved, and a second path, which is a control path for controlling data, in order to prevent I/O performance of the storage service from being degraded.

Figure 13:
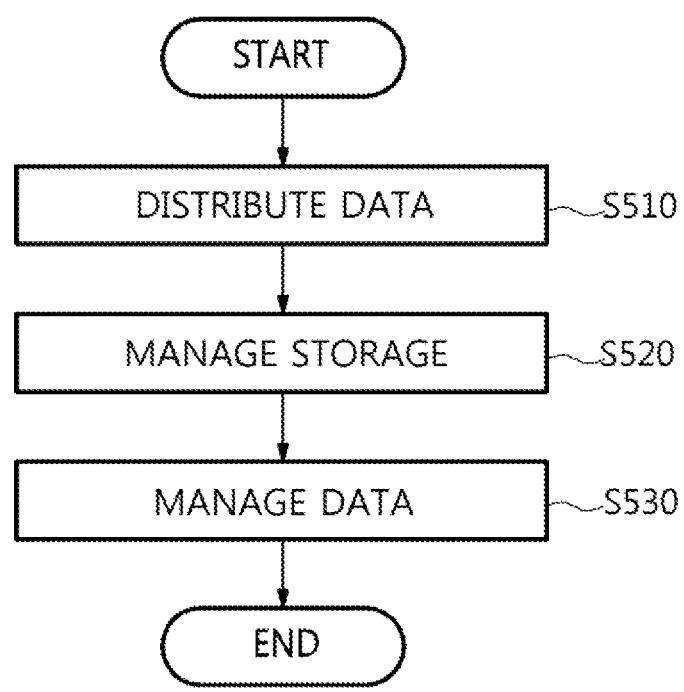
FIG. 13 is a flowchart that shows an integrated storage provision method for providing a single virtual interface according to an embodiment of the present invention.

FIG. 13 is a flowchart that shows a method for providing integrated storage in order to provide a single virtual interface according to an embodiment of the present invention.

Referring to FIG. 13, in the method for providing integrated storage according to an embodiment of the present invention, first, data distribution may be performed at step S510.

That is, at step S510, data may be distributed in order to store the data in the integrated storage including on-premises storage and cloud storage.

Also, in the method for providing integrated storage according to an embodiment of the present invention, storage management may be performed at step S520.

That is, at step S520, the integrated storage is connected in order to store the distributed data, and information about storage tiering pertaining to the data to be stored is provided.

Here, the information about storage tiering may vary depending on the performance of storage, the time during which the data is used, and the frequency with which the data is accessed.

Also, in the method for providing integrated storage according to an embodiment of the present invention, data management may be performed at step S530.

That is, at step S530, the integrated storage is provided as virtual data storage regardless of the location at which the data is actually stored, and an interface through which the virtual storage is provided as a single virtual storage unit may be provided to a user.

Here, at step S530, a user access mechanism for using the single virtual storage unit may be provided.

Here, the user access mechanism may vary depending on the type of the single virtual storage unit.

Here, at step S530, the data to be stored in the single virtual storage unit may be converted by performing at least one of fragmentation, encryption, and compression of the data, and may then be stored.

Figure 14:
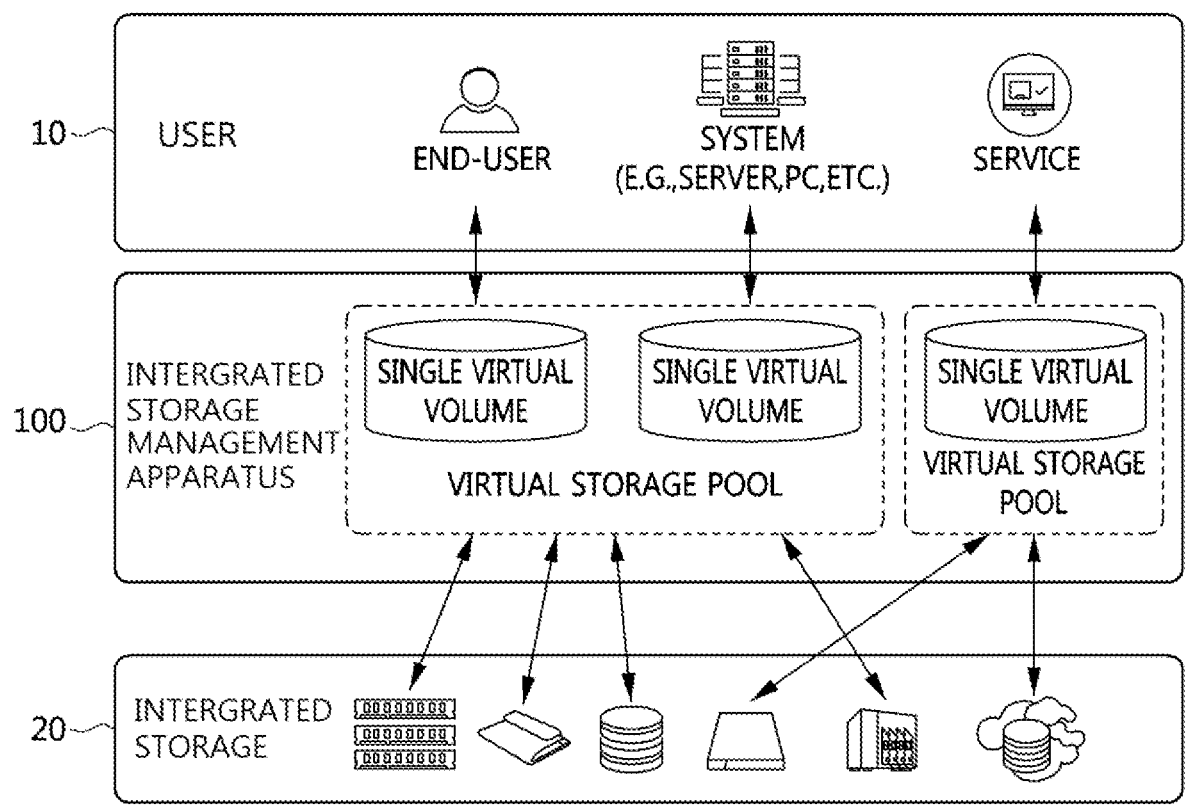
FIG. 14 is a view that shows an integrated storage system according to an embodiment of the present invention.

FIG. 14 is a view that shows an integrated storage system according to an embodiment of the present invention.

Referring to FIG. 14, the integrated storage system according to an embodiment of the present invention may include a user client device 10, an integrated storage management apparatus 100, and integrated storage 20.

The integrated storage management apparatus 100 may handle various types of data, such as structured data, semi-structured data, and unstructured data, in order to improve service quality and to create a new service.

Here, the integrated storage management apparatus 100 may efficiently manage and integrate heterogeneous storage units in order to use various types of data in the integrated storage 20, and may easily use data.

Here, the integrated storage management apparatus 100 may provide the user client device 10 with a virtual storage pool of a single virtual volume.

Here, the integrated storage management apparatus 100 may process various requests, such as requests to create, store, read, and update data in the integrated storage 20 and a request to delete data therefrom.

Data virtualization is technology for managing multiple data resources regardless of the location of the resources or data structures.

The multiple data resources may include files, databases, systems, storage, and the like.

The integrated storage 20 may be located in the back end of the integrated storage management apparatus 100, and may be physical storage devices in which data is finally stored.

The physical storage devices may include on-premises storage 22 (e.g., memory, an SSD, an HDD, SAS storage, iSCSI storage, NAS, and the like) and public cloud storage 21 with different management units such as a block, an object, and a file.

The single virtual volume may be an object that is provided to the user client device 10 in the form of a virtual block device, a virtual disk, or a virtual file created through storage virtualization.

The user client device 10 may include an end user, a server, an operating system, an application, and a storage device of a cloud service provider, which uses the single virtual volume.

The integrated storage management apparatus 100 may consolidate the different types of storage into a virtual storage pool through storage virtualization and may divide the virtual storage pool into a single virtual volume regardless of the physical storage devices.

Such a single virtual volume enables data to be easily accessed without obstacles and has no negative effect on the performance of the storage device.

The virtual storage pool may be a logical object that provides a single virtual volume including the storage devices of the integrated storage 20 as a single virtual storage view.

As illustrated in FIG. 14, a virtual storage pool may be formed with the integrated storage 20 (cloud storage 21 and on-premises storage 22) configured by connecting an API and an I/O interface. The integrated storage 20 may support a block type, a file type, and an object type.

The integrated storage management apparatus 100 may create a single virtual volume storage unit and provide the same to the user client device 10.

Here, the integrated storage management apparatus 100 may create a single virtual volume storage unit through the federation of the integrated storage 20, and may provide a single access point to the user client device 10.

Here, the integrated storage management apparatus 100 may support the single virtual volume storage unit through policy-based provisioning and management. Through policy-based provisioning and management, an operator may improve operation management, and a user may easily use the single virtual volume storage unit by simplifying the same.

Each user may create, store, read, update, or delete user data (e.g., images for a gallery, audio files for a music player, documents for collaboration, application data for a service, and the like) on the single virtual volume storage unit of the user.

When the user client device 10 is connected with the single virtual volume storage unit of the integrated storage management apparatus 100, unified request commands may be executed through connections with different storage units of the integrated storage 20.

The user data supported by the integrated storage management apparatus 100 may or may not be distributed depending on the policy-based provisioning and management.

The integrated storage management apparatus 100 may abstract data information, such as the location of storage, a data history, the type of the content of the data, and the like, from user data in order to handle the user data.

Here, the integrated storage management apparatus 100 may realize data virtualization on the virtual storage pool through data abstraction.

Here, the integrated storage management apparatus 100 may reduce the processes of retrieving and inputting/outputting data by reducing data replication in the virtual storage pool and by providing an environment in which data is shared without replication or movement of original data. The interaction for data manipulation may be based on the data manipulation policy of a user. For example, read-only access, overwriting, replication, or the like in the sharing mode may be allowed based on the data manipulation policy.

Here, the single virtual volume may be constructed by a set of connections with different storage units of the integrated storage.

Figure 15:
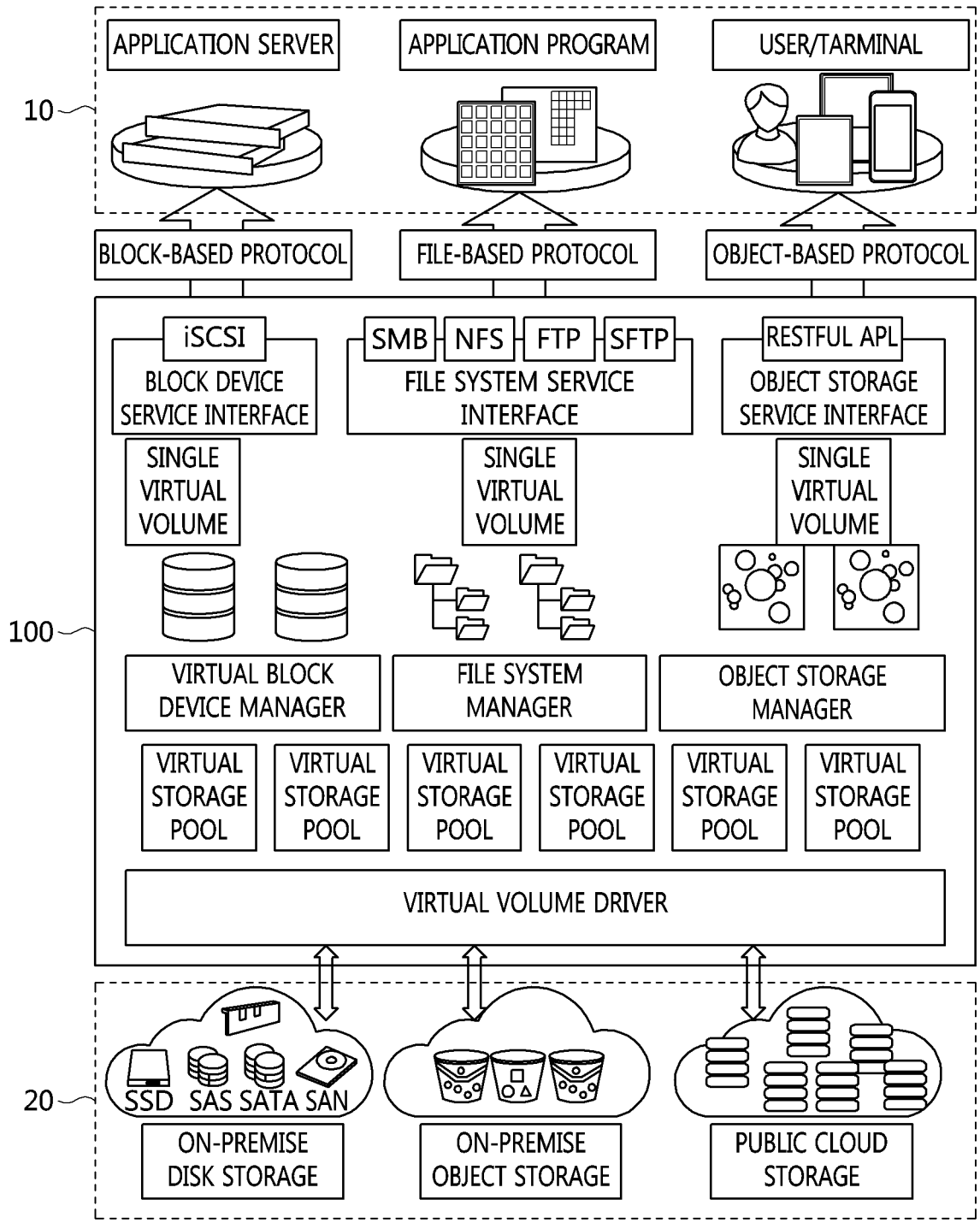
FIG. 15 is a view that shows multiple types of storage and access mechanisms for data access in an integrated storage system according to an embodiment of the present invention.

FIG. 15 is a view that shows multiple storage types and access mechanisms for data access in an integrated storage system according to an embodiment of the present invention.

Referring to FIG. 15, a user client device 10 may request a variety of service interfaces and storage types from the integrated storage management apparatus 100.

Here, the integrated storage management apparatus 100 may provide the user client device 10 with a service interface using a suitable access mechanism.

Here, the user client device 10 may use its storage type as the type of the storage to be provided.

Here, the user client device 10 may be a general user (who possesses individual storage), an application, an application server, or another cloud system.

Here, the integrated storage management apparatus 100 may provide various types of storage.

The storage type may correspond to object-based storage, file-based storage, block-based storage, and the like.

Here, the integrated storage management apparatus 100 may support an access mechanism based on the storage type.

The access mechanism may include different types of protocols depending on the storage type.

Examples of the protocols may include iSCSI for block device storage, SMB, NFS, SFTP, and FTP for file-based storage, and a protocol with the RESTful API for object-based storage.

An example of the service information may be a service catalog for the integrated storage device 20.

Figure 16:
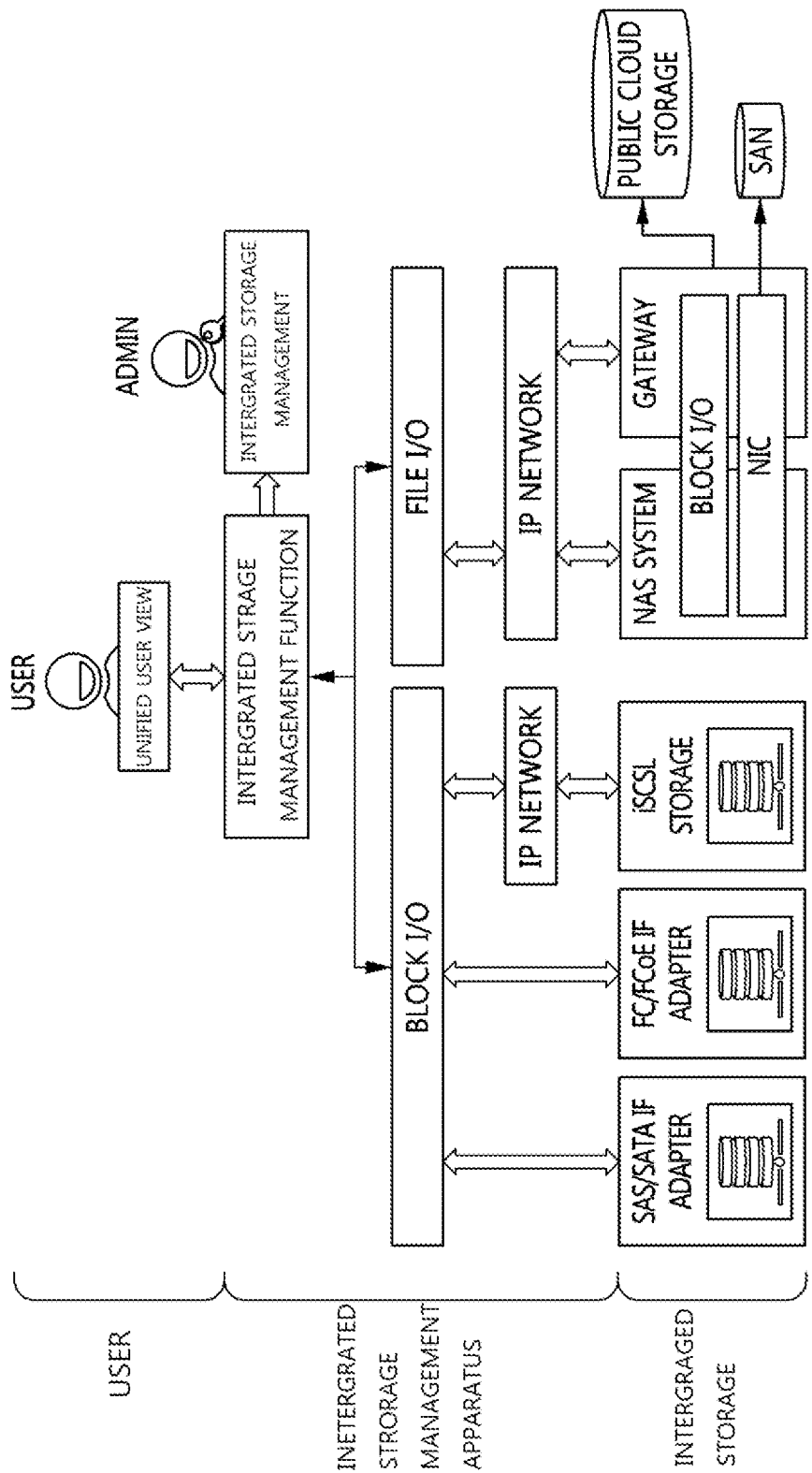
FIG. 16 is a view that shows a use case for an integrated storage management system according to an embodiment of the present invention.

FIG. 16 is a view that shows a use case for an integrated storage management system according to an embodiment of the present invention.

Referring to FIG. 16, a use case for an integrated storage management apparatus 100, which is a single storage system connected with integrated storage 20 including multiple types of storage, is illustrated. As illustrated in FIG. 16, the storage system may appear to the user client device 10 as integrated storage through a unified user view regardless of the type of the storage system, and the user client device 10 does not need to care about the kind of storage that it uses. Accordingly, through the integrated storage management function provided by the integrated storage management apparatus 100, the integrated storage system or the appliance makes the multiple storage systems of the integrated storage appear to the user client device 10 as a single system. Further, the integrated storage management apparatus 100 may provide a unified management interface.

Here, the user client device 10 may request data storage from the integrated storage management apparatus 100, and may be provided with the data storage.

Here, the integrated storage management apparatus 100 may provide a storage system, an appliance, or a device for integrating different types of storage.

Here, depending on the requirement of the user client device 10, the integrated storage management apparatus 100 may support various types of data storage, such as block-based storage, file-based storage, or other cloud storage.

Here, the integrated storage management apparatus 100 may provide a unified user interface to the user client device 10 in order to enable data storage access for various types of service mechanisms.

Here, the integrated storage management apparatus 100 may prevent data loss, caused due to errors from a storage structure based on storage of data in a distributed manner, and may provide a data recovery function in the event of a system error.

Here, the integrated storage management apparatus 100 may provide a global namespace.

Here, the integrated storage management apparatus 100 may provide a unified management interface to the user client device 10 in order to manage the data storage.

Here, the integrated storage management apparatus 100 provides a user interface for policies and other options, thereby integrating the data storage.

Here, the integrated storage management apparatus 100 may verify the data of the user client device 10.

Figure 17:
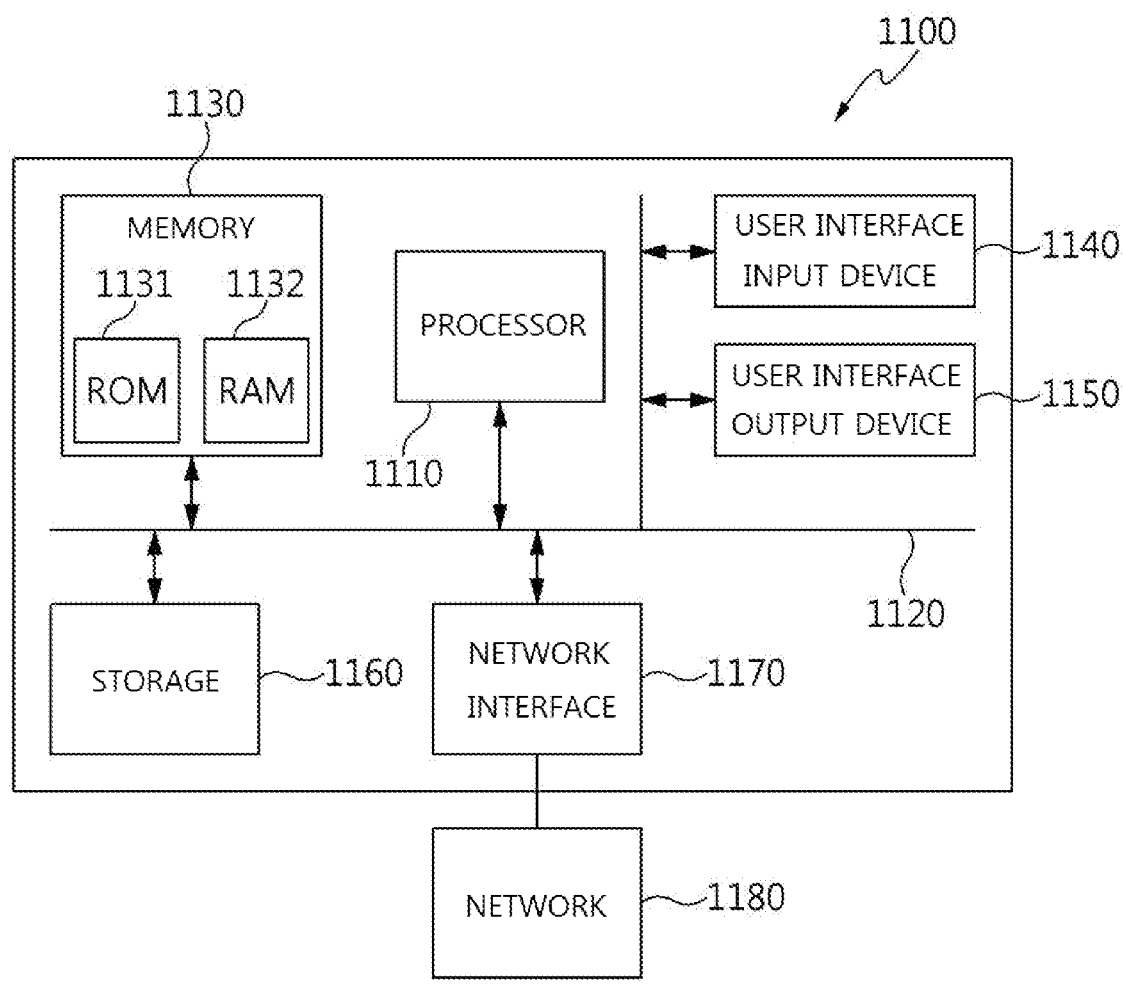
FIG. 17 is a block diagram that shows a computer system according to an embodiment of the present invention.

FIG. 17 is a block diagram that shows a computer system according to an embodiment of the present invention.

Referring to FIG. 17, the user client device 10 and the integrated storage management apparatus 100 according to an embodiment of the present invention may be implemented in a computer system 1100 including a computer-readable recording medium. As shown in FIG. 17, the computer system 1100 may include at least one processor 1110, memory 1130, a user interface input device 1140, a user interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

The present invention may improve the performance of read and write operations in integrated storage that combines cloud storage and on-premises storage.

Also, the present invention may enable cloud storage and on-premises storage included in integrated storage to provide a data storage service with the same performance.

Also, the present invention may enable data of a user to be moved in consideration of the flexibility of storage space and cost efficiencies.

Also, the present invention may support various types of cloud storage services, such as Amazon S3, Microsoft Azure, and the like, thereby providing an integrated storage service that meets user requirements.

Also, the present invention may enable data in cloud storage to be accessed at a speed close to the speed at which data in on-premises storage is accessed.

Also, the present invention may provide a service interface through which a user may access cloud-integrated storage using various service protocols.

Also, the present invention may provide various types of storage services, such as a storage service for storing conventional files or data blocks, a storage service for storing objects, which has recently come to be provided by cloud storage providers, and the like.

Also, the present invention may guarantee secure data transfer between on-premises storage and cloud storage, thereby guaranteeing the confidentiality of user data.

Also, the present invention may prevent data loss caused due to system errors.

Also, the present invention may make it easy to construct a system by providing cloud-integrated storage in the form of an appliance in which storage hardware and software are integrated for user convenience.

Also, the present invention may provide a multitenant function for simultaneously performing multiple cloud services.

As described above, the apparatus and method for managing integrated storage according to the present invention are not limitedly applied to the configurations and operations of the above-described embodiments, but all or some of the embodiments may be selectively combined and configured, so that the embodiments may be modified in various ways.

What is claimed is:

1. An apparatus for managing an integrated storage, the apparatus comprising:

a data distribution and storage unit for distributing and storing user data in the integrated storage, the integrated storage including an on-premises storage and a cloud storage;

a storage management unit for connecting to the integrated storage and providing information about storage tiering pertaining to the user data;

a data manipulation unit for providing the integrated storage as a virtual data storage regardless of a location at which the user data is actually stored, wherein the virtual data storage provides one or more virtual storage volumes in the virtual data storage, wherein the virtual data storage includes a write cache or a read cache for the user data using a high-speed storage separated from the on-premises storage and the cloud storage, wherein the virtual data storage includes a RAM-based cache area and a Solid-State Drive (SSD)-based cache area, wherein when the RAM-based cache area is exhausted, the write cache or the read cache automatically expands to the SSD-based cache area, wherein the data manipulation unit provides data recovery of the user data when a storage or connection failure occurs, wherein the most-recently used user data are restored for preventing data loss due to errors from the storage or connection failure, wherein the data manipulation unit backups the user data to recover the user data on the storage failure for supporting consistency for the user data being replicated, and wherein the data manipulation unit provides a back-up of a global namespace, wherein the back-up of the global namespace is synchronized with the user data, a storage connection unit for providing a user client with an interface for a single virtual storage unit in the virtual data storage, wherein the information about the storage tiering varies depending on performance of storage, time during which the user data is used, and a frequency with which the user data is accessed, wherein the storage management unit provides a function of storing the user data using the storage tiering based on storage performance, time of data usage, and data access frequency, wherein the storage management unit initially stores the user data in the high-speed storage in the integrated storage and then moves the stored data to a lower tier of storage in the integrated storage based on a change of the data access frequency, wherein the data manipulation unit provides a sharing data operation by updating a sharing status of the user data in a registry after checking the sharing status of the user data, wherein during the sharing data operation, the user data is shared, the data manipulation unit provides capacity saving of the integrated storage using deduplication of the user data, and provides encryption or decryption of the user data for data transfer to the integrated storage, wherein the sharing status indicates whether the user data is shared or not, wherein the storage management unit automatically moves the user data between storage tiers of storage depending on characteristics of the user data;

wherein the apparatus further includes a policy management unit for providing metadata, wherein the metadata includes data operation metadata required to perform data operations and storage operation metadata required to perform storage operations, wherein the data manipulation unit performs data management of the user data based on the data operation metadata, wherein the data management includes attributes of the virtual data storage and the single virtual storage unit and further includes transaction logs, snapshots, and replication of the user data, wherein the storage management unit performs storage operations based on the data operation metadata, the data operation metadata providing a description for Application Program Interface (API) for customer data operation, reading or writing speed of the user data, and capacity of the virtual data storage, wherein the storage management unit provides the interface to connect the integrated storage, wherein the interface includes a proxy interface to configure various types of storage interfaces with a software program including one of an API for the integrated storage, a software agent, a daemon, and a web worker, wherein the proxy interface connects the integrated storage by automatically detecting the storage interfaces with the software program, wherein the storage connection unit provides translation between the data manipulation unit and the interface to connect the integrated storage, wherein the storage connection unit provides a cloud service registered in the cloud storage and the on-premises storage of the integrated storage to the user client through the virtual data storage by operating in conjunction with the integrated storage, and wherein, in the read cache, the data is broken into multiple pieces of block data depending on hashes using a data deduplication engine and in the write cache, a log for data recovery in a node connected with over a network is recorded when the data stored in the write cache area is lost due to system failure.

2. The apparatus of claim 1, wherein the storage connection unit provides a user access mechanism for using the single virtual storage unit, wherein the user access mechanism varies depending on a type of the single virtual storage unit.

3. The apparatus of claim 1, wherein the data manipulation unit converts the user data to be stored in the single virtual storage unit by performing at least one of fragmentation, encryption, and compression of the user data and stores the converted data.

4. The apparatus of claim 1, wherein the expanded areas back up data in real time in the SSD, and, when the user writes data in the cache areas, the cache areas return a result immediately after writing the cache areas for a fast response.

5. A method for managing an integrated storage, performed by an apparatus for managing the integrated storage, the method comprising:

providing metadata, wherein the metadata includes data operation metadata required to perform data operations and storage operation metadata required to perform storage operations;

distributing and storing user data in the integrated storage, the integrated storage including an on-premises storage and a cloud storage;

managing storage by connecting to the integrated storage and by providing information about storage tiering pertaining to the user data to be stored;

managing the user data by providing the integrated storage as a virtual data storage regardless of a location at which the user data is actually stored and by providing a user client with an interface for a single virtual storage unit in the virtual data storage, wherein the virtual data storage provides one or more virtual storage volumes in the virtual data storage, wherein the virtual data storage provides a write cache or a read cache for the user data using a high-speed storage separated from the on-premises storage and the cloud storage, wherein the virtual data storage includes a RAM-based cache area and a Solid-State Drive (SSD)-based cache area, wherein when the RAM-based cache area is exhausted, the write cache or the read cache automatically expands to the SSD-based cache area, wherein the managing the distributed data includes providing data recovery of the user data when a storage or connection failure occurs, wherein the most-recently used user data are restored for preventing data loss due to errors from the storage or connection failure, wherein the user data is back up to recover the user data on the storage failure for supporting consistency for the user data being replicated, wherein a back-up of a global namespace is provided, the back-up of the global namespace being synchronized with the user data, wherein the information about storage tiering varies depending on performance of storage, time during which the user data is used, and a frequency with which the user data is accessed, wherein the managing storage includes:

providing a function of storing the user data using the storage tiering based on storage performance, time of data usage, and data access frequency, wherein the user data is initially stored in a high-speed storage in the integrated storage and then moved to a lower tier of storage in the integrated storage based on the data access frequency, wherein a sharing data operation is provided by updating a sharing status of the user data in a registry after the sharing status of the user data is checked, wherein during the sharing data operation, the user data is shared, capacity saving of the integrated storage is provided using deduplication of the user data, and encryption or decryption of the user data is provided for data transfer to the integrated storage, wherein the sharing status indicates whether the user data is shared or not, wherein the user data is automatically moved between storage tiers of storage depending on characteristics of the user data, wherein data management of the user data is performed based on the data operation metadata, wherein the data management includes attributes of the virtual data storage and the single virtual storage unit and further includes transaction logs, snapshots, and replication of the user data, and wherein the storage operations are performed based on the data operation metadata, wherein the data operation metadata provides a description for Application Program Interface (API) for customer data operation, reading or writing speed of the data, and capacity of the virtual data storage;

wherein the method further includes providing the interface to connect the integrated storage, wherein the interface includes a proxy interface to configure various types of storage interfaces with a software program including one of an API for the integrated storage, a software agent, a daemon, and a web worker, wherein the proxy interface connects the integrated storage by automatically detecting the storage interfaces with the software program, wherein translation is provided between a data manipulation unit and the interface to connect the integrated storage, wherein the method further includes providing a cloud service registered in the cloud storage and the on-premises storage of the integrated storage to the user client through the virtual data storage by operating in conjunction with the integrated storage, and wherein, in the read cache, the data is broken into multiple pieces of block data depending on hashes using a data deduplication engine and, in the write cache, a log for data recovery in a node connected with over a network is recorded when the data stored in the write cache area is lost due to system failure.

6. The method of claim 5, wherein managing the user data is configured to provide a user access mechanism for using the single virtual storage unit, wherein the user access mechanism varies depending on a type of the single virtual storage unit.

7. The method of claim 5, wherein managing the user data is configured to convert the user data to be stored in the single virtual storage unit by performing at least one of fragmentation, encryption, and compression of the user data and to store the converted data.

8. The method of claim 5, wherein the expanded areas back up data in real time in the SSD, and, when the user writes data in the cache areas, the cache areas return a result immediately after writing the cache areas for a fast response.

* * * * *